US009359467B2

(12) United States Patent
Leibler et al.

(10) Patent No.: US 9,359,467 B2
(45) Date of Patent: Jun. 7, 2016

(54) THERMOSET/SUPRAMOLECULAR HYBRID COMPOSITES AND RESINS THAT CAN BE HOT-FORMED AND RECYCLED

(75) Inventors: Ludwik Leibler, Paris (FR); Damien Montarnal, Paris (FR); François-Genes Tournilhac, Paris (FR); Mathieu Capelot, Paris (FR)

(73) Assignees: ARKEMA FRANCE, Colombes (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 214 days.

(21) Appl. No.: 14/116,541

(22) PCT Filed: May 10, 2012

(86) PCT No.: PCT/EP2012/058616
§ 371 (c)(1),
(2), (4) Date: Nov. 8, 2013

(87) PCT Pub. No.: WO2012/152859
PCT Pub. Date: Nov. 15, 2012

(65) Prior Publication Data
US 2014/0088223 A1    Mar. 27, 2014

(30) Foreign Application Priority Data
May 10, 2011    (FR) ........................................ 1154010

(51) Int. Cl.
| B29B 17/04 | (2006.01) |
| B29B 17/00 | (2006.01) |
| B29B 13/10 | (2006.01) |
| B29C 67/24 | (2006.01) |
| C08L 67/00 | (2006.01) |
| C08G 59/42 | (2006.01) |
| C08G 83/00 | (2006.01) |
| C08L 63/00 | (2006.01) |
| C08G 59/14 | (2006.01) |
| C08L 67/08 | (2006.01) |
| B29K 63/00 | (2006.01) |
| B29K 105/24 | (2006.01) |

(52) U.S. Cl.
CPC ............ *C08G 59/1477* (2013.01); *B29B 17/00* (2013.01); *B29C 67/24* (2013.01); *C08G 59/42* (2013.01); *C08G 83/008* (2013.01); *C08L 63/00* (2013.01); *C08L 67/08* (2013.01); *B29K 2063/00* (2013.01); *B29K 2105/24* (2013.01); *Y02W 30/62* (2015.05)

(58) Field of Classification Search
CPC .............. C08G 59/42; C08G 59/4207; C08G 59/4284; C08G 83/008; B29B 13/10; B29B 17/00; B29B 17/0026; B29B 17/04; B29B 17/0412; B29B 17/0484; B29C 67/24; B29K 2063/00; B29K 2105/24; B29K 2105/243; C08L 63/00; C08L 67/08; Y02W 30/62

USPC .......... 523/427, 428, 457; 264/239, 266, 319, 264/331.11, 331.12, 331.18, 331.19, 264/331.21, 911
See application file for complete search history.

(56) References Cited

U.S. PATENT DOCUMENTS

| 5,496,907 | A | 3/1996 | Dochniak |
| 6,194,490 | B1 | 2/2001 | Roth et al. |
| 2002/0111434 | A1 | 8/2002 | White et al. |
| 2003/0060569 | A1 | 3/2003 | White et al. |
| 2006/0111469 | A1 | 5/2006 | White et al. |
| 2010/0305334 | A1 | 12/2010 | Tournilhac |
| 2011/0003872 | A1 | 1/2011 | Tournilhac et al. |
| 2011/0065866 | A1 | 3/2011 | Leibler et al. |
| 2011/0245375 | A1 | 10/2011 | Nesvadba et al. |
| 2011/0319524 | A1* | 12/2011 | Leibler ................... B29C 73/02 523/446 |
| 2012/0022221 | A1 | 1/2012 | Hidalgo et al. |
| 2012/0074353 | A1* | 3/2012 | Van Hemelryck . C08G 59/3263 252/182.17 |
| 2015/0125646 | A1* | 5/2015 | Tournilhac ............... C09K 5/14 428/36.92 |

FOREIGN PATENT DOCUMENTS

| FR | 2930947 A1 | 11/2009 |
| WO | WO 99/43729 A1 | 9/1999 |

(Continued)

OTHER PUBLICATIONS

International Search Report (PCT/ISA/210) mailed on Jun. 19, 2012, by the European Patent Office as the International Searching Authority for International Application No. PCT/EP2012/058616.
(Continued)

*Primary Examiner* — Michael J Feely
(74) *Attorney, Agent, or Firm* — Buchanan Ingersoll & Rooney P.C.

(57) ABSTRACT

Thermoset/supramolecular hybrid composites and resins, resulting from bringing at least one thermosetting resin precursor, this thermosetting resin precursor including hydroxyl functions and/or epoxy groups, and optionally ester functions, into contact with at least one hardener chosen from carboxylic acids and acid anhydrides, and with at least one compound including, on the one hand, at least one associative group, and on the other hand at least one function enabling the grafting thereof to the thermosetting resin precursor, to the hardener or to the product resulting from the reaction of the thermosetting resin precursor and the hardener, in the presence of at least one transesterification catalyst. Process for manufacturing these materials, process for transforming and process for recycling these materials. Novel solid forms of hybrid composites and resins which can be used in the implementation of these processes.

22 Claims, 4 Drawing Sheets

(56) References Cited

FOREIGN PATENT DOCUMENTS

Figure 1:
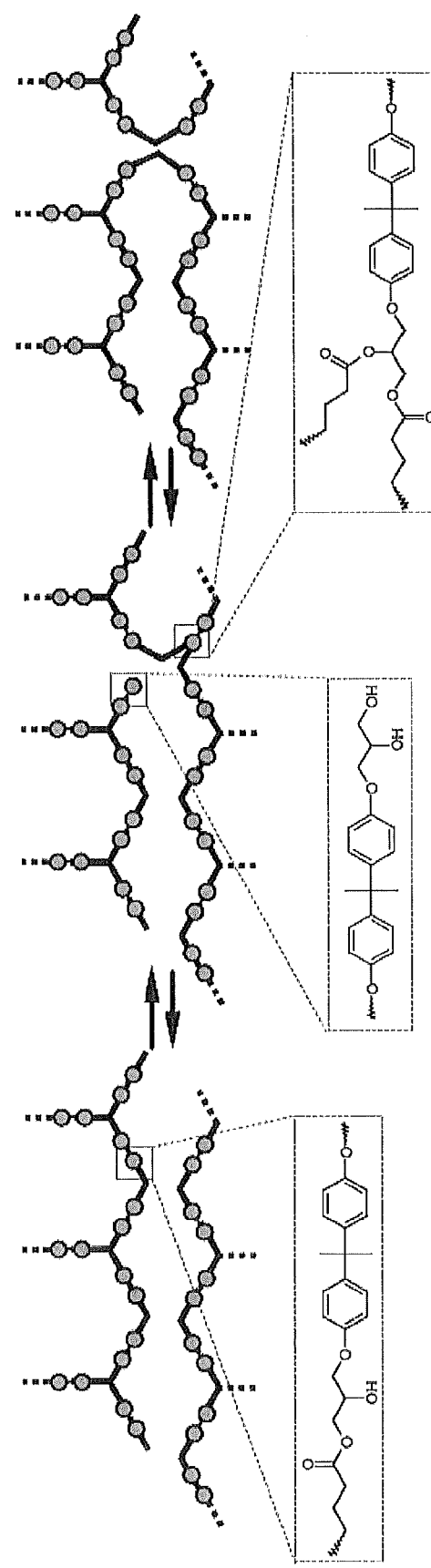

| WO | WO 02/064653 A2 | 8/2002 |
| WO | WO 2009/071554 A1 | 6/2009 |
| WO | WO 2009/081065 A2 | 7/2009 |
| WO | WO 2010/057922 A1 | 5/2010 |
| WO | WO 2010/112743 A1 | 10/2010 |
| WO | WO 2010/139906 A1 * | 12/2010 ........... C08K 5/3445 |

OTHER PUBLICATIONS

Written Opinion (PCT/ISA/237) mailed on Jun. 19, 2012, by the European Patent Office as the International Searching Authority for International Application No. PCT/EP2012/058616.

* cited by examiner

THERMOSET/SUPRAMOLECULAR HYBRID COMPOSITES AND RESINS THAT CAN BE HOT-FORMED AND RECYCLED

FIELD OF THE INVENTION

The invention relates to novel crosslinkable systems with thermoplastic properties, these systems being based on resins combining thermosetting system chemistry and supramolecular chemistry, in particular based on epoxy resins comprising groups capable of associating via hydrogen bonds. More particularly, it relates to thermoset/supramolecular hybrid resins and the composites containing them, it being possible for these materials to be hot-formed. The subject of the invention is also a process for manufacturing these materials, a transformation process and a process for recycling these materials. The invention also relates to novel solid forms of thermoset composites and resins which can be used in the implementation of these processes. Depending on the type of resin used, the fields of application are either those of flexible materials and composites: elastomers, coatings, adhesives and glues, or else those of rigid composites and materials: encapsulations, electrical insulations, mechanical or structural components.

In the field of composites, three classes of materials can be schematically distinguished as a function of the type of resin used as matrix: composites with a thermoplastic matrix, composites with a thermosetting matrix and, finally, composites with a thermoplastic elastomer matrix.

Thermoplastic resins are noncrosslinked polymers, such as polyethylene or PVC, the flexibility of which can be modulated by adding plasticizers. These resins can be processed and optionally reprocessed at high temperature. However, they have the drawback of having a high viscosity in the molten state, which makes it difficult to impregnate reinforcing fibers or fillers, and moreover, owing to the presence of plasticizers, the harmlessness and long-term stability of these materials is also not satisfactory.

Flexible thermosetting resins are crosslinked polymers. They are, for example, epoxy resin formulations in which the epoxy precursor and/or the hardener are chosen so as to obtain soft materials. Rigid thermosetting resins are crosslinked polymers which have a glass transition temperature substantially above ambient temperature. They are, for example, epoxy resin formulations in which the epoxy precursor and/or the hardener are chosen so as to obtain rigid materials. These resins are processed before crosslinking starting from precursors which are low-viscosity liquids. These compositions have the advantage of having high fluidity before crosslinking, which facilitates the impregnation of fillers or fibers for the manufacture of composites. They also have a very good thermal resistance and mechanical strength and also good resistance to solvents. On the other hand, they have the drawback of not allowing reforming of the composite material obtained or recycling of the resin after reaction.

Thermoplastic elastomers, for instance block copolymers based on microphase separation (of SBS/SEBS/SIS, polyurethanes/PEBA, ionomer or supramolecular elastomer type) themselves have the advantage of allowing reforming after obtaining the composite. However, their poor fluidity constitutes a serious drawback for their use, in particular when it is necessary to impregnate a support with these compositions, in particular a support of fiber or filler type.

Thermoplastic elastomers also have the drawback of having poor resistance to high temperatures and to solvents, in particular to oils. They do not allow the user to make an extemporaneous formulation as a function of needs as easily as epoxy resins (choice of the resin/hardener mixture, then curing).

In order to remedy these drawbacks, the inventors have developed novel systems, based on epoxy resin and on associative molecules, and therefore thermosetting/supramolecular hybrid systems, which have a thermoplastic-type behavior. By definition, a thermoset is a polymer which cures under the action of an energy, in particular under the action of heat. The materials manufactured from thermosetting polymers have the advantage of being able to be cured so as to have a high mechanical strength and high thermal and chemical resistance, and for this reason can replace metals in certain applications. They have the advantage of being lighter than metals. They can also be used as matrices in composite materials. Among the thermosetting polymers, mention may be made of unsaturated polyesters, phenoplasts, polyepoxides, polyurethanes and aminoplasts.

Thermosets are molded and crosslinked at elevated temperature or at ambient temperature. The processing thereof is performed via the liquid route starting from monomers. They therefore have the drawback of requiring precise manipulations and metering of liquids for their processing. The transportation of precursor compounds, in liquid form, is also not satisfactory in terms of safety.

In addition, conventional thermosets must be manufactured, and in particular they must be molded, having at the outset the appropriate shape for the final use. This is because no transformation is any longer possible once they are polymerized, aside from machining, which, in the case of rigid thermoplastics, remains tricky because of their fragility. Flexible or hard components and composites based on thermosetting resins are neither transformable nor formable, and they cannot be recycled.

In parallel with thermosetting resins, a class of polymeric materials, thermoplastics, has been developed. Thermoplastics can be formed at high temperature by molding or by injection-molding, but have less advantageous mechanical properties and thermal and chemical resistance properties than those of thermosets.

In addition, the forming of thermoplastics can be carried out only within very narrow temperature ranges. This is because when thermoplastics are heated, they become liquid, the fluidity of which varies abruptly in the region of the melting points and glass transition temperatures, which does not allow application thereto of a whole variety of transformation methods that exist for glass and for metals, for example.

"Supramolecular" materials are materials consisting of compounds held together by noncovalent bonds, such as hydrogen, aromatic, ionic and/or hydrophobic bonds. One advantage of these materials is that these physical bonds are reversible, in particular under the influence of the temperature or via the action of a selected solvent. It is thus possible to envision using them in fields of application such as coatings (paints, cosmetics, etc.), adhesives, hot-melt adhesives and powdered paints.

Some of them also have elastomeric properties. In contrast to conventional elastomers, these materials have the advantage of being able to fluidify above a certain temperature, which facilitates the processing thereof, in particular the molding thereof. This property also allows the recycling thereof. Although they do not consist of crosslinked polymers but of small molecules, these materials are, like elastomers, capable of exhibiting a dimensional stability over very long times and of recovering their initial form after large strains. They can be used to manufacture leaktight seals, thermal or acoustic insulators, tires, cables, sheaths, footwear soles, packagings, patches (cosmetic or dermopharmaceutical), dressings, elastic clamp collars, vacuum pipes, or pipes and flexible tubing for the transportation of fluids.

Hybrid materials formed from arborescent materials comprising associative groups are known, in particular from documents WO 2009/071554 and WO 2009/081065. These materials results from the grafting of associative molecules to epoxy or polyol networks cured using acid hardeners. When they are chemically crosslinked, such materials have advantageous elastomeric properties, in particular they show a high creep resistance and at the same time they are self-repairable, that is to say in the event of rupture or damage, it is possible, after bringing the damaged fragments back into contact, to at least partly regain the initial mechanical properties. However, like thermoset materials, no transformation of these hybrid materials is any longer possible once they are polymerized. Flexible or hard components and composites based on these hybrid resins are neither transformable nor formable, and they cannot be recycled.

One of the objectives of the invention was the development of thermosetting/supramolecular hybrid resins which are hot-transformable after curing. In particular, the materials of the invention have the property of being able to be heated to temperatures such that they become liquid without undergoing destruction or degradation of their structure. The viscosity of these materials varies slowly over a broad temperature range, with behavior which approaches the Arrhenius law. This property allows them to undergo transformations via very varied processes which cannot be envisioned for thermoplastics. It in particular makes it possible to obtain object shapes which are difficult or impossible to obtain by molding or for which the production of a mold proves to be too expensive for the envisioned manufacture.

The presence of hydroxyl functions promotes the adhesion of the compositions of the invention to materials such as wood, glass, or metals, and thus allows the manufacture of very strong composites and their use as glues and coatings. This property, already present in conventional epoxy resins, is increased here by the presence of functional groups capable of associating via hydrogen bonds. The invention makes it possible to develop novel applications for thermosetting materials by facilitating their forming and their recycling. Thus, it can open up fields of application and processing methods for thermosetting/supramolecular hybrid resins, in particular epoxy resins incorporating associative groups, which could not in any way be envisioned hitherto. Finally, the invention makes it possible to remedy the problems of metering out and handling liquids that were hitherto inherent in the use of thermosets.

The materials of the invention may be optionally formed like conventional thermosetting/supramolecular hybrid resins advantageously using their fluidity before crosslinking, or like thermoplastics after the crosslinking reactions, or alternatively by hot-forming using specific methods.

STATE OF THE ART

It is known from the prior art (Aflal et al., *Appl. Polym. Sci.* 2009, 113, 2191) to repair an article based on epoxy resin. The solution proposed consisted in only partially reacting the epoxy functional groups during the manufacture of the article. This was able to be performed by using a sub-stoichiometric amount of hardener. To repair a damaged article, a high temperature is then applied to the part of the article concerned, such that the epoxy functions that have remained free react together and form covalent bonds.

Another method known from application WO 02/064653 for repairing a polymer-based article consists in dispersing in the polymer microcapsules filled with a polymerizable agent. Damage to the article causes a rupture of the microcapsules and the release of the polymerizable agent into the fracture. The polymerization of this agent allows the fracture to be repaired.

Document U.S. Pat. No. 5,470,609 describes a process for repairing surface defects of articles made of a plastic material. Such articles were hot-crosslinked and are repaired using a coating composition comprising the constituents of a resin that have not reacted together. The reaction is triggered after placing in contact with the surface to be repaired.

However, these methods are limited to the repair of articles, sometimes only at the surface, and do not make it possible to envision the recycling of thermosetting resins, nor their transformation, once cured, into an article having another shape. In addition, these repair methods allow the article to be repaired a maximum of only once or twice. Indeed, when all the epoxy functions have reacted—or when the polymerizable agents have polymerized —, it is no longer possible to repair the component or the material. Finally, materials comprising capsules usually have inferior mechanical properties to those of the resins of which they are composed.

Polymeric systems using reversible covalent bonds have already been described. Thus, Lehn, J. M., *Progress Polym. Sci.*, 2005, 30, 814-831, and Skene W. G., Lehn, J. M., *P.N.A.S.* 2004, 22, 8270-8275, disclose polymeric resins capable of depolymerizing and of repolymerizing under the action of heat. The team of Professor Wudl (Chen X. et al., *Science* 2002, 295, 1698-1702) has described self-repairing materials based on the reversibility of the Diels-Alder reaction.

However, these studies concern only the repair and assembly of components and do not envision the transformation of an article based on a thermosetting resin into an article of differing shape.

The document J. O. Outwater, D. G. Gerry, *J. Adhesion*, vol. 1, 1969, 290-298 mentions the possibility of heat-repairing a fracture in an epoxy resin. It is taught in said document that the energy restitution associated with the disappearance of the fracture surfaces is responsible for this phenomenon. However, these observations have not been repeated for more than 40 years and have not led to any development. Furthermore, the resin composition that was used in said document does not correspond to the definition of the compositions of the invention and does not make it possible to transform an article or to be subjected to recycling.

Moreover, the hybrid materials described in WO 2009/071554 and WO 2009/081065 are self-repairable, that is to say an incision made in these materials fades away by itself with time. However, neither the recycling of these resins nor their transformation, once cured, into an article having another shape can be envisioned.

Document WO 2010/112743 describes compositions comprising a fatty acid dimer or trimer, an epoxy resin and UDETA. However, said document does not describe the presence in these compositions of a transesterification catalyst. It also does not mention the possibility of recycling the materials obtained after curing of these compositions.

Document WO 99/43729 describes a composition comprising two epoxy resins, a polycarboxylic acid anhydride, and a heterocyclic compound chosen from four formulae. The latter compound can in particular comprise an imidazole ring. The heterocyclic compound is present as a catalyst for the reaction of the epoxy resins with the anhydride. However, said document does not describe the presence in these compositions of a compound comprising an associative group and a function for the grafting thereof to the resin and/or to the hardener and/or to the product of reaction of the resin and of the hardener.

Document WO 2010/057922 describes a composition comprising a polyacrylate with an epoxy functionality and a polyacrylate with an acid functionality or a diacid, and also a thermolatent catalyst of amidine type comprising a group which can be considered to be an associative group and a substituent. When it is placed in the presence of the polymer-precursor-based composition and heated, the thermolatent amidine compound decomposes to give a heterocycle which has lost its substitution. This thermolatent compound is thus not capable of grafting, by means of its substituents, to the resin precursor, or to the hardener or to the product of reaction of the resin and of the hardener. According to the present invention, the thermosetting/supramolecular hybrid resins have chemical reversibility, which, combined with a mechanical stress, can be used to give an article a new shape.

In the event of rupture or damage, the articles made from these resins offer greater self-repair possibilities than those of the prior art. Indeed: the joint presence of the associative groups and of the chemical reversibility allows a first, incomplete but immediate, repair step by simply bringing the fractured surfaces into contact again, optionally followed by a second step, at a higher temperature, capable of fully restoring the mechanical properties of the initial component.

Furthermore, the hybrid resin compositions of the invention also differ from those of the prior art in that they are not special resins, but are composed of an ordinary thermosetting resin, in particular an ordinary epoxy resin, of a hardener comprising free carboxylic acid or acid anhydride functional groups, which is capable of reacting with the epoxide functions by generating hydroxyl ester functions, of graftable associative groups, of a conventional esterification catalyst and of a transesterification catalyst which may or may not be identical to the esterification catalyst. They differ from the epoxy/supramolecular hybrid resins of the prior art by virtue of the presence of a transesterification catalyst, in particular of amounts of transesterification catalyst higher than those normally used, since transesterification is not usually desired or envisioned.

These compositions and the processes of the invention can thus be used in all the usual applications of thermosetting resins, in particular epoxy resins, but have the advantageous properties that have been mentioned above and are illustrated in detail in the description and the exemplary embodiments. The compounds and the processes of the invention can also be used in the conventional applications of thermoplastic elastomers, for which they have the advantageous properties of epoxy resins, in particular thermal resistance, chemical resistance, a high softening point or low shrinkage.

SUMMARY OF THE INVENTION

A subject of the invention is a composition of thermosetting hybrid resin grafted via associative groups, this composition resulting from the reaction of at least one thermosetting resin precursor having hydroxyl functions and/or epoxy groups, with at least one hardener which contains free carboxylic acid functional groups or acid anhydride functional groups and at least one compound comprising at least one associative group and at least one function allowing the grafting thereof to the thermosetting resin precursor, to the hardener or to the product of the reaction of the thermosetting resin precursor and of the hardener, in the presence of at least one transesterification catalyst, the amount and the functionality of the acid being chosen such that the resin is in the form of a network maintained by ester functions and that free hydroxyl functions remain after reaction of the precursor with the hardener.

A subject of the invention is also the composite materials comprising such a resin composition, a process for manufacturing an article or a material based on this resin, a process for transforming an article or a material based on this resin, a process for assembling and bonding materials and composites based on this resin, a process for repairing an article based on this resin, a process for recycling a resin-based article. It also relates to the articles made of thermosetting material which can be obtained by means of the process of the invention.

The invention is based on the transesterification reactions which can occur when a polymer contains both ester functions and hydroxyl functions, and also on the exchanges between associative groups.

To allow these transesterifications and to obtain materials that have thermoplastic elastomer behavior, epoxy resins are polymerized using, as hardeners, molecules comprising at least two carboxylic acid functions in free form or in anhydride form.

In order for the transesterification reaction to be exploitable over a range of temperatures that does not lead to destruction of the material and over controllable timescales, the invention makes use of a catalyst.

Compared with thermoplastic resins, which are themselves also capable of being hot-transformed, the material according to the invention can be worked without flowing under its own weight over a much broader range of temperatures, which makes it possible to apply varied transformation methods, in particular without having the imperative need for molding. These methods are of the same nature as those used in the metal and glass fields.

This method also makes it possible, by applying a sufficient temperature and an appropriate mechanical stress, to mold articles made of thermosetting material from thermoset material; in particular, it makes it possible to prepare articles by injection-molding using granules of thermoset material. The method also makes it possible, by applying a sufficient temperature and with good contact of the components, to assemble components by welding so as to form a more complex article. The method also makes it possible, by applying a sufficient temperature and a mechanical stress, to repair a crack or damage caused in a component consisting of the material. In addition, it may be envisioned to manufacture sandwich structures from sheets of thermoset material of the invention which intercalate and act as glue between materials such as wood, glass, plastic or metal, for example.

Another advantage of this process is that it allows the recycling of the material after use, it being possible for the components to be reconditioned in the form of elemental units or components and then reformed again according to the invention.

Finally, the combination, in the resins and materials of the invention, of acid hardeners with other types of hardeners makes it possible to obtain formulations that have a wide range of mechanical properties at ambient temperature (control of the Tg, of the modulus).

The resins according to the invention have a particular hybrid structure capable of conferring on them very varied properties according to the proportion of the reagents used for their synthesis. It is possible to obtain materials with elastomeric thermoplastic behavior exhibiting a compromise in terms of properties, such as a capacity of self-repair/resistance to creep, or of fluidity, of resistance to tearing.

It is thus in particular possible to obtain a material which has the properties of a thermoplastic elastomer, that is to say of a material capable, at ambient temperature, of being able to be subjected to a uniaxial strain, advantageously of at least 20% for 15 minutes, and then of recovering, once the stress has been released, its initial size, with a set of less than 5% of its initial size, and which can be formed or reformed at high temperature. The material according to the invention is also self-healing, that is to say capable, once cut, torn or scratched, of repairing itself at least partly by simply bringing the fractured surfaces back into contact without requiring heating or the application of a high pressure or the carrying out of any chemical reaction. The material thus repaired which retains elastomeric properties can be used as it is at least in a first step. In a second step, the application of an appropriate temperature makes it possible to complete the repair by virtue of the transesterification reactions without, however, triggering any flow of the material.

In contrast with conventional thermoset glues and adhesives (epoxies), it is possible to relax the stresses trapped in composite or sandwich structures in the course of their forming or their use and thus to improve the mechanical strength and chemical resistance (resistance to solvents and stress cracking) and the lifetime of components and articles.

DETAILED DESCRIPTION OF THE INVENTION

A subject of the invention is a resin composition resulting from bringing:

at least one thermosetting resin precursor (P), this thermosetting resin precursor (P) comprising hydroxyl functions and/or epoxy groups, and optionally ester functions, into contact with at least one hardener (D) chosen from carboxylic acids and acid anhydrides, and with at least one compound (C) comprising, on the one hand, at least one associative group and, on the other hand, at least one function allowing the grafting thereof to the thermosetting resin precursor (P), to the hardener (D) or to the product resulting from the reaction of (P) and of (D), in the presence of at least one transesterification catalyst.

For the purpose of the present invention, the term "thermosetting resin precursor" is intended to mean an oligomer, a prepolymer, a polymer or any macromolecule which, when it is reacted with a hardener, also called crosslinking agent, in the presence of an energy source, in particular of heat, and optionally of a small amount of catalyst, gives a polymer network with a solid structure. The thermosetting resins known from the prior art cannot after crosslinking be transformed under the action of temperature, since the reactions having resulted in the formation of a three-dimensional network are irreversible. The thermosetting resins crosslinked with long-chain aliphatic acids have a behavior of elastomer type: their glass transition temperature is less than 20° C. When the thermosetting resin is an aromatic epoxy resin crosslinked with aromatic acids, with short-chain carboxylic acids (1 to 5 carbon atoms) or with anhydrides, the behavior is that of a rigid resin with a glass transition temperature, Tg, above ambient temperature. Above its glass transition temperature, an article based on a thermoset resin is elastically deformable under the action of a mechanical stress. However, in the prior art resins, the interruption of the stress leads, above Tg, to a return to the initial shape of the article.

The compound (C) comprises, on the one hand, a group chosen from groups capable of forming a bond of hydrogen, aromatic, ionic and/or hydrophobic type and, on the other hand, a function allowing the grafting thereof to the thermosetting resin precursor (P), to the hardener (D) or to the product resulting from the reaction of (P) and (D). The expression "function allowing the grafting to the thermosetting resin precursor (P), to the hardener (D) or to the product resulting from the reaction of (P) and (D)" is intended to mean advantageously, for the purpose of the present invention, a function allowing the covalent grafting of the compound (C) to one of these entities. This compound (C) can be chosen in the following way:

The term "associative groups" is intended to mean groups capable of associating with one another via bonds chosen from hydrogen bonds, aromatic bonds, ionic bonds and/or hydrophobic bonds. Preferably, the associative group is chosen from those capable of associating via hydrogen bonds. In the compound (C), the associative group(s) is (are) linked by means of a spacer arm to a function chosen from functions that are reactive with carboxylic acids, with epoxy functions or with alcohol functions.

The compound (C) may be advantageously represented by the following general formula:

in which A represents an associative group,

L represents a linker arm,

R represents a function $R_1$ that is reactive with carboxylic acids, or a function $R_2$ that is reactive with epoxy functions or with alcohol functions.

Among the functions $R_1$ that are reactive with carboxylic acids, mention may be made of alcohol (OH) and amine (NH, $NH_2$) functions. Among the functions $R_2$ that are reactive with alcohol or epoxy functions, mention may be made of carboxylic acids. Advantageously, R represents $NH_2$ or COOH.

Preferably, the spacer arm L is chosen from aryl, aralkyl, alkanepoly-yl and alkenepoly-yl functions, optionally interrupted with one or more groups chosen from an ether, amine, thioether, amide, ester, urea, urethane, anhydride and carbonyl bridge.

L may comprise from 1 to 50 carbon atoms and up to 6 heteroatoms.

Preferably, A is chosen from associative groups capable of forming hydrogen bonds. Advantageously, A is chosen from groups capable of associating with one another via 1 to 6 hydrogen bonds.

Among the associative groups, mention may particularly be made of those corresponding to formulae (C1), (C2), (C3) and (C4):

(C1)

(C2)

(C3)

-continued

(C4)

in which U, V, W, X and T, which may be identical or different, represent a group chosen from: N, NH, CH, C—CH$_3$, C=O, C=NH, C=S, at least one of U, V, W and X representing N or NH, it being possible for the bonds between N, U, V, W and X to be single bonds, or double bonds and optionally to form an aromatic ring (in the case of C2 and C4).

The linkage of the associative group (C1), (C2), (C3) or (C4) with the linker arm L can be made by means of any nitrogen atom or carbon atom of the ring.

Particular examples of associative groups are the following:

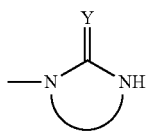
(C'1)

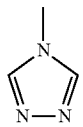
(C'2)

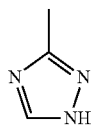
(C'3)

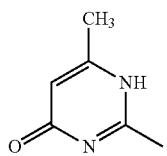
(C'4)

with Y chosen from: an O or S atom or an NH group.

In C'1, the linkage represented by an arc of a circle between N and NH can be chosen from: —CH$_2$—CH$_2$—; —CH=CH—; —NH—CH$_2$—.

Among the associative groups known to those skilled in the art, mention may be made of imidazolidinyl, triazolyl, triazinyl, bisureyl and ureidopyrimidyl groups.

Other particular examples are ureidopyrimidone derivatives, such as 2-((6-aminohexylamino)carbonylamino)-6-methyl-4[11-]pyrimidinone (UPY).

Preferred associative groups are imidazolidones, triazolyl and ureidopyrimidone.

Preferably, the compound (C) is chosen from the following molecules:

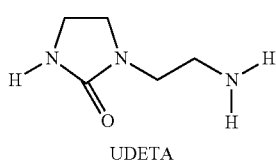
UDETA

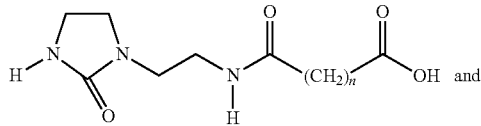
UDETA n-COOH with n an integer and preferably 1 < n < 23

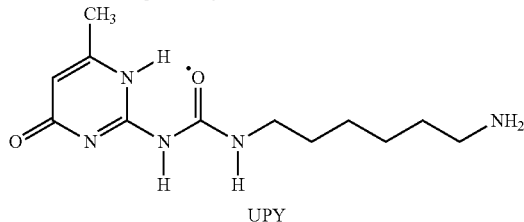
UPY

The proportions of the various components of the hybrid resin are advantageously adjusted according to the expected properties.

Preferably, the amount of hardener is chosen such that the resin is in the form of a network, and even more preferentially:

$N_O$ denoting the number of moles of hydroxyl functions in the precursor (P), $N_x$ denoting the number of moles of epoxy groups in the precursor (P), $N_1$ denoting the number of moles of $R_1$ groups in the compound (C).

$N_2$ denoting the number of moles of $R_2$ groups in the compound (C).

$N_A$ denoting the number of moles of carboxylic acid functions of the hardener (D) which are capable of forming a bond with a hydroxyl function or with an epoxy group of the thermosetting polymer precursor (P):

$$N_A-N_1<N_O+2N_X-N_2$$

When the hardener is a dicarboxylic acid or an acid anhydride, it is capable of providing two carboxylic acid functions per molecule and $N_A$ is equal to twice the number of moles of hardener. When the hardener is a tricarboxylic acid, it is capable of providing three acid functions per molecule and $N_A$ is equal to three times the number of moles of hardener. Most of the time, the hardener is a mixture of compounds with diverse functionalities and $N_A$ must be calculated as a function of the acid number of the mixture used. In order to obtain a network, the hardener is preferably a mixture of compounds having an average functionality strictly greater than 2.

Preferably, the amounts of reagents are chosen such that, after crosslinking, no unreacted epoxy functions remain.

This is reflected by the relationship $N_A-N_1>N_X-N_2$.

Advantageously, $N_1$ and $N_2$ having been defined above, $N_1+N_2$ denotes the number of moles of compound (C) which has associative groups in the resin composition of the invention, and $N_1$ and $N_2$ confirm the following two proposals:

$$N_1>0.01N_A \text{ or } N_2>0.01N_B$$

$$N_1<0.9N_A \text{ and } N_2<0.9N_B$$

where $N_B$ represents the number of alcohol and/or epoxy functions of the precursor which are capable of reacting with $R_2$.

Preferably, only one of the two numbers $N_1$ or $N_2$ is non-zero.

The invention relates more particularly to materials obtained by reacting thermosetting resin precursors with one or more hardeners and one or more compounds comprising at least one associative group, these materials comprising a) ester functions and also b) hydroxyl functions and c) associative groups.

These materials comprise ester functions and generally result from the polymerization reaction between a hardener comprising at least one polycarboxylic acid and a thermosetting resin precursor comprising at least one epoxy function or one hydroxyl function. Other types of precursors and hardeners resulting in a resin with free hydroxyl groups and ester functions can be provided for. They also comprise covalent grafting with associative groups by means of linker arms, these associative groups conferring on them properties characteristic of supramolecular networks.

According to the invention, precursors which comprise free hydroxyl functions and/or epoxy groups are selected. These free hydroxyl functions and epoxy groups are capable of reacting with the reactive functions of the hardener so as to form a three-dimensional network maintained by ester functions. It may be envisioned that the thermosetting resin precursor is itself in the form of a polyether or polyester chain which comprises hydroxyl functions and/or epoxy groups capable of participating in a crosslinking reaction in the presence of a hardener. It is also possible to envision that the thermosetting resin precursor is in the form of an acrylic or methacrylic resin comprising epoxy groups.

Preferentially, the invention relates to thermosetting resins of epoxy resin type. Thus, advantageously, the thermosetting resin precursor is an epoxy resin precursor. Advantageously, the epoxy resin precursor represents at least 10% by weight of the weight of the thermosetting precursor composition, advantageously at least 20%, preferably at least 40% and even better still at least 60%.

A thermosetting resin precursor of epoxy resin type is defined as a molecule containing more than one epoxide group. The epoxide group, also known as oxirane or ethoxyline, is represented below:

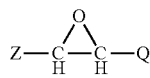

in which Q=H or Q=ZT, Z and Z' being hydrocarbon-based groups.

There are two major categories of epoxy resins: epoxy resins of glycidyl type, and epoxy resins of non-glycidyl type. Epoxy resins of glycidyl type are themselves classified into glycidyl ether, glycidyl ester and glycidyl amine. Non-glycidyl epoxy resins are of aliphatic or cycloaliphatic type.

Glycidyl epoxy resins are prepared by means of a condensation reaction of the appropriate dihydroxy compound with a diacid or a diamine and with epichlorohydrin. Non-glycidyl epoxy resins are formed by peroxidation of the olefinic double bonds of a polymer or of a polyunsaturated molecule.

Among the glycidyl epoxy ethers, bisphenol A diglycidyl ether (BADGE) represented below is the one most commonly used.

BADGE-based resins have excellent electrical properties, low shrinkage, good adhesion to numerous metals, good moisture resistance, good heat resistance and good resistance to mechanical impacts.

The properties of BADGE resins depend on the value of n, which is the degree of polymerization, which itself depends on the stoichiometry of the synthesis reaction. As a general rule, n ranges from 0 to 25.

Novolac epoxy resins (the formula of which is represented below) are glycidyl ethers of Novolac phenolic resins. They are obtained by reacting phenol with formaldehyde in the presence of an acid catalyst so as to produce a Novolac phenolic resin, followed by a reaction with epichlorohydrin in the presence of sodium hydroxide as catalyst.

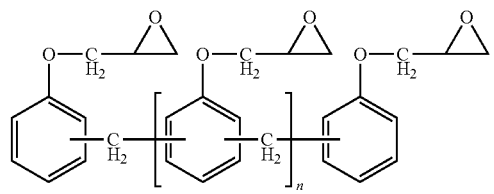

Novolac epoxy resins generally contain several epoxide groups. The multiple epoxide groups make it possible to produce resins with a high crosslinking density. Novolac epoxy resins are widely used for formulating molded compounds for microelectronics on account of their greater resistance to high temperatures, their excellent moldability, and their superior mechanical, electrical, heat-resistance and moisture-resistance properties.

The epoxy resins to which the invention applies may be any of them provided that their precursors comprise, before reaction with the carboxylic acid, a mean number of epoxide and hydroxyl functions per precursor such that:

$$2<2<n_X>+<n_O>$$

This inequality should be considered in the strict sense.

$<n_X>$ being the numerical mean of the number of epoxy functions per precursor, $<n_O>$ being the numerical mean of the number of hydroxyl functions per precursor.

The numerical mean being defined by:

$<n>=sum(P(i)*i)/sum(P(i))$, where $P(i)$ is the number of molecules having i functions.

Preferably, $3 \leq 2<n_X>+<n_O>$

Even more advantageously, $4 \leq 2<n_X>+<n_O>$

The thermosetting resin precursor that can be used in the present invention may in particular be chosen from: Novolac epoxy resins, bisphenol A diglycidyl ether (BADGE), bisphenol F diglycidyl ether, tetraglycidyl methylene dianiline, pentaerythritol tetraglycidyl ether, tetrabromobisphenol A diglycidyl ether, or hydroquinone diglycidyl ether, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene

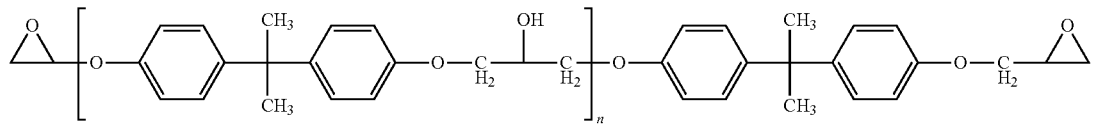

glycol diglycidyl ether, polypropylene glycol diglycidyl ether, polytetramethylene glycol diglycidyl ether, resorcinol diglycidyl ether, neopentyl glycol diglycidyl ether, bisphenol A polyethylene glycol diglycidyl ether, bisphenol A polypropylene glycol diglycidyl ether, terephthalic acid diglycidyl ester, epoxidized polyunsaturated fatty acids, epoxidized vegetable oils, epoxidized fish oils and epoxidized limonene, and mixtures thereof.

Advantageously, it is chosen from: BADGE, epoxidized soybean oil and Novolac resins.

A hardener is necessary to form a crosslinked three-dimensional network from an epoxy resin.

A wide variety of hardeners exists for epoxy resins. The agents commonly used for crosslinking epoxides are amines, polyamides, polycarboxylic acids, phenolic resins, anhydrides, isocyanates and polymercaptans. The reaction kinetics and the glass transition temperature, Tg, of the crosslinked resin depend on the nature of the hardener. The choice of resin and of hardener depends essentially on the desired application and properties. The stoichiometry of the epoxy-hardener system also affects the properties of the cured material.

The hybrid resin according to the present invention is manufactured with at least one hardener comprising carboxylic acid functional groups in free form or in acid anhydride form. Advantageously, the resin of the invention is manufactured with at least one hardener comprising carboxylic acid functional groups in free form, and optionally with, in addition, a second hardener. Hardeners of the long-chain carboxylic acid class are typically used for obtaining flexible materials (moderately crosslinked networks with a low Tg).

Carboxylic acids react with epoxide groups to form esters. The presence of at least two carboxylic acid functions on the hardener compound is necessary to polymerize the resin. The presence of at least one hardener compound comprising at least three carboxylic acid functions makes it possible to form a three-dimensional network. Activation with a catalyst is necessary.

The preparation of the resin according to the invention can be carried out with one or more hardeners, including advantageously at least one of polyfunctional carboxylic acid type. Advantageously, the hardener is chosen from: carboxylic acids in the form of a mixture of fatty acid dimers and trimers comprising 2 to 40 carbon atoms.

As acids that can be used in the invention, mention may be made of carboxylic acids comprising 2 to 40 carbon atoms, such as linear diacids (glutaric acid, adipic acid, pimelic acid, suberic acid, azelaic acid, sebacic acid, dodecanedioic acid and homologs thereof of higher weights) and also mixtures thereof, or fatty acid derivatives. It is preferred to use trimers (oligomers of three identical or different monomers) and mixtures of fatty acid dimers and trimers, in particular of vegetable origin. These compounds result from the oligomerization of unsaturated fatty acids such as: undecylenic, myristoleic, palmitoleic, oleic, linoleic, linolenic, ricinoleic, eicosenoic or docosenoic acid, which are usually found in pine oil, rapeseed oil, corn oil, sunflower oil, soybean oil, grapeseed oil, linseed oil and jojoba oil, and also eicosapentaenoic acid and docosahexaenoic acid which are found in fish oils.

As acids that can be used in the invention, mention may also be made of aromatic carboxylic acids comprising 2 to 40 carbon atoms, for instance aromatic diacids, such as phthalic acid, trimellitic acid, terephthalic acid or naphthalenedicarboxylic acid.

As examples of fatty acid trimers, mention may be made of the compounds of the following formulae which illustrate cyclic trimers derived from fatty acids containing 18 carbon atoms, given that the compounds that are commercially available are mixtures of steric isomers and of positional isomers of these structures, which are optionally partially or totally hydrogenated.

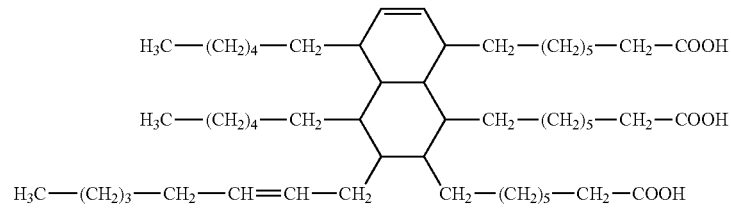

C18 Acid Trimer

A mixture of fatty acid oligomers containing linear or cyclic $C_{18}$ fatty acid dimers, trimers and monomers, said mixture predominantly being dimers and trimers and containing a small percentage (usually less than 5%) of monomers, may thus be used. Preferably, said mixture comprises:
- 0.1% to 40% by weight and preferably 0.1% to 5% by weight of identical or different fatty acid monomers,
- 0.1% to 99% by weight and preferably 18% to 85% by weight of identical or different fatty acid dimers, and
- 0.1% to 90% by weight and preferably 5% to 85% by weight of identical or different fatty acid trimers.

Examples of mixtures of fatty acid dimers/trimers that may be mentioned include (weight %):
Pripol® 1017 from Croda, mixture of 75-80% dimers and 18-22% trimers with about 1-3% fatty acid monomers,
Pripol® 1048 from Croda, 50/50% mixture of dimers/trimers,
Pripol® 1013 from Croda, mixture of 95-98% dimers and 2-4% trimers with 0.2% maximum of fatty acid monomers,
Pripol® 1006 from Croda, mixture of 92-98% dimers and a maximum of 4% trimers with 0.4% maximum of fatty acid monomers,
Pripol® 1040 from Croda, mixture of fatty acid dimers and trimers with at least 75% trimers and less than 1% fatty acid monomers,
Unidyme® 60 from Arizona Chemicals, mixture of 33% dimers and 67% trimers with less than 1% fatty acid monomers,
Unidyme® 40 from Arizona Chemicals, mixture of 65% dimers and 35% trimers with less than 1% fatty acid monomers,
Unidyme® 14 from Arizona Chemicals, mixture of 94% dimers and less than 5% trimers and other higher oligomers with about 1% fatty acid monomers,
Empol® 1008 from Cognis, mixture of 92% dimers and 3% higher oligomers, essentially trimers, with about 5% fatty acid monomers, Empol® 1018 from Cognis, mixture of 81% dimers and 14% higher oligomers, essentially trimers, with about 5% fatty acid monomers, Radiacid® 0980 from Oleon, mixture of dimers and trimers with at least 70% trimers.

The products Pripol®, Unidyme®, Empol® and Radiacid® comprise $C_{18}$ fatty acid monomers and fatty acid oligomers corresponding to multiples of $C_{18}$.

As diacids that may be used in the invention, mention may also be made of polyoxoalkylenes (polyoxoethylene, polyoxopropylene, etc.) comprising carboxylic acid functions at the ends, phosphoric acid, polyesters and polyamides, with a branched or unbranched structure, comprising carboxylic acid functions at the ends.

As hardener of anhydride type that can be used in the resin compositions of the invention, mention may be made of cyclic anhydrides, for instance phthalic anhydride, methyl nadic anhydride, hexahydrophthalic anhydride, dodecylsuccinic anhydride and glutaric anhydride.

Mention may also be made of succinic anhydride, maleic anhydride, chlorendic anhydride, nadic anhydride, tetrachlorophthalic anhydride, pyromellitic dianhydride, 1,2,3,4-cyclopentanetetracarboxylic acid dianhydride, aliphatic acid polyanhydrides such as polyazelaic polyanhydride or polysebacic polyanhydride.

Preferably, the hardener is chosen from: fatty acid dimers and trimers and polyoxoalkylenes comprising carboxylic acids at the ends.

According to one preferred variant of the invention, the compound (C) is obtained by reacting at least one compound of polyfunctional carboxylic acid type, as described above in the category of hardeners, with an associative molecule comprising a function that is reactive with carboxylic acids.

For example, the compound (C) can be obtained by reacting at least one compound of polyfunctional carboxylic acid type with at least one compound (c*) corresponding to the formula below:

(c*)

in which A represents an associative group,

L' represents a linker arm, for example a $C_1$-$C_{12}$ alkanediyl group, optionally interrupted with one or more bridges chosen from ether and amine bridges, R' represents a function that is reactive with carboxylic acids, for instance an OH function or an $NH_2$ function.

For example, (c*) can be chosen from the following compounds: 2-aminoethylimidazolidone (UDETA), 1-(2-[(2-aminoethyl)amino]ethyl)imidazolidone (UTETA), 1-(2-{2-[(2-aminoethylamino)ethyl]amino}ethyl]imidazolidone (UTEPA), 3-amino-1,2,4-triazole (3-ATA) and 4-amino-1,2,4-triazole (4-ATA).

Advantageously, according to this variant, a part of the acid hardener (D) is first reacted with the compound (c*) comprising associative groups, the proportion of compound (c*) being such that only a part of the acid hardener (D) reacts with (c*).

Advantageously, the reaction is carried out under conditions such that the polycarboxylic acid hardener molecules generally keep at least one carboxylic acid function free, not bonded to (c*).

A mixture of hardener compound (D), which has not reacted with (c*), and of compound (C), resulting from the reaction of (D) with (c*), comprising at least one carboxylic acid function, is thus obtained. This mixture is brought into contact with the thermosetting resin precursor (P) under conditions which allow the free acid functions of the hardener (D) and of the compound (C) to react with the epoxide and alcohol functions of the thermosetting resin precursor.

According to another embodiment of this variant, it is possible to envision reacting (c*) with a first polyacid hardener (D) so as to obtain a compound (C) comprising at least one free carboxylic acid function. In a second step, this compound (C) is then reacted with the precursor (P) in the presence of a second polyacid hardener (D) which is identical to or different than the first, under conditions which allow the acid functions of the hardener (D) and the acid functions of the compound (C) to react with the epoxide and alcohol functions of the thermosetting resin precursor.

According to this variant in which the compound (C) is obtained by reacting at least one compound of polyfunctional carboxylic acid type, as described above in the category of hardeners, with an associative molecule comprising a function that is reactive with carboxylic acids, the amount of compound (c*) is chosen such that 5% to 75% of the acid functions of the total amount of acid hardener (D) react with (c*), preferably from 5% to 50%, and advantageously from 10% to 30%.

According to another variant of the invention, it is possible to envision reacting the precursor (P) with the hardener (D) under conditions which allow the free acid functions of the hardener (D) to react with the epoxide and alcohol functions of the thermosetting resin precursor. Then, in a second step, the compound (C) is introduced into the mixture, under conditions which allow the reactive functions of the compound (C) to react with the alcohol functions of the thermosetting resin precursor or with the acid functions of the hardener.

In this case, the compound (C) may have as a reactive function either COOH acid functions, or OH or $NH_2$ functions.

In the presence of acidic or basic catalysts, the carboxylic acids react with the epoxide groups to form esters. Hitherto, the catalysts used by those skilled in the art were optimized for this esterification reaction and are added in amounts of between 1 and 3 mol % relative to the epoxy groups [Epoxy Resins, Chemistry and Technology, second edition, published by C. A. May, Marcel Dekker, New York 1988]. When they are used in a greater amount, it is generally noted that they are not dissolved in the thermosetting resin precursor, under the processing conditions of the prior art.

Generally, the amount of catalyst used in the compositions of the invention can range from 1% to 25% of the total molar amount of hydroxyl and epoxy that are contained in the precursor (P). Advantageously, the total molar amount of catalyst used in the compositions of the invention is from 2% to 25%, even better still 3% to 25%, preferably 4% to 25%, even more preferentially 5% to 25% of the total molar amount of hydroxyl and epoxy that are contained in the precursor (P).

The hardener(s) of carboxylic acid type can be used alone or as a mixture with other types of hardeners, in particular hardeners of amine type.

A hardener of amine type may be chosen from primary or secondary amines containing at least one $NH_2$ function or two NH functions and from 2 to 40 carbon atoms.

This amine may, for example, be chosen from aliphatic amines such as diethylenetriamine, triethylenetetramine, tetraethylenepentamine, dihexylenetriamine, cadaverine, putrescine, hexanediamine, spermine, isophorone diamine, and also aromatic amines such as phenylenediamine, diaminodiphenylmethane, diaminodiphenyl sulfone and methylenebischlorodiethylaniline.

Advantageously, when an amine hardener is used in the mixture, the amine/epoxy ratio is limited so that, in the absence of ester bonds, the tertiary amine bonds thus created are not sufficient to pass the gel point. In practice, those skilled in the art can rely on the vast literature which exists on epoxy-amine systems to select the appropriate composition. The test described below which concerns the formation of a network can be used to check that the gel point is not exceeded:

In a material, it is considered that the gel point is not reached as long as a cylindrical post made of this material, with an initial height of approximately 1 cm at ambient temperature and a diameter of 1 cm, after having been left for 10 hours at a temperature of 100° C. and then equilibrated for 30 minutes at ambient temperature, has a final height that differs by more than 20% from the initial height.

Advantageously, when one or more hardeners other than a carboxylic acid, in free form or in anhydride form, is used as a mixture with the hardener(s) of carboxylic acid type, the acid hardener represents at least 10 mol %, preferably at least 20 mol %, advantageously at least 40 mol % and even better still at least 60 mol % relative to the hardeners as a whole.

According to the prior art, by using an equimolar ratio between the carboxylic acids and the epoxy groups, a moderately crosslinked polyhydroxy ester network is obtained. With a 2:1 ratio between carboxylic acids and epoxy, a highly crosslinked polyester network is obtained, which does not comprise the free hydroxyl groups necessary for a transesterification reaction.

According to the invention, a compromise must be chosen between the presence of free hydroxyls for performing transesterification reactions and a high crosslinking density giving a solid and mechanically strong material.

According to the invention, the hardener is used in an amount sufficient to form a network. In particular, an acid hardener is used in an amount sufficient to form a network based on ester bridges.

For the purpose of this invention, a network is formed once there is a continuous path consisting of a succession of monomers linked to one another by ester bridges, this path traversing the sample from end to end. These monomers may originate from the thermosetting precursors and/or from the hardeners. Those skilled in the art are aware of theoretical and/or empirical guides for determining the compositions that make it possible to obtain a network from the envisioned resins and hardeners (cf., for example, P. J. Flory *Principles of Polymer Chemistry* Cornell University Press Ithaca-NY 1953).

In practice, the formation of a network is ensured if, after formation of the ester bridges, a cylindrical post made of this material, with an initial height of approximately 1 cm at ambient temperature and a diameter of 1 cm, after having been left for 10 hours at a temperature of 100° C. and then equilibrated for 30 minutes at ambient temperature, has a final height differing by less than 20% from the initial height.

According to the invention, use is advantageously made of a precursor comprising at least two epoxy functions per molecule, and a hardener comprising at least two carboxylic acid functions, in free form or in the form of an anhydride, per molecule.

At least one of the catalysts must be chosen from transesterification catalysts. Certain transesterification catalysts make it possible to catalyze the reaction of epoxides with the hardener. However, it may also be envisioned to use a specific catalyst for opening epoxides in addition to the transesterification catalyst.

According to the invention, a transesterification catalyst is used in an amount sufficient to allow the relaxation of the ester bonds within the network.

Advantageously, the transesterification catalysts are used in the invention in an amount ranging from 1 to 25 mol % relative to the total molar amount of hydroxyl and epoxy that are contained in the thermosetting resin precursor.

According to the invention, the term "transesterification catalyst" is intended to mean a compound that satisfies the following test:

Catalyst Test:
Preparation of the Ester E1:

6.1 mmol of octanoic acid (Mw=144.2 g/mol, m=0.88 g) and 0.37 mmol (6 mol %) of catalyst C1, 2-methylimidazole (2-MI, Mw=82.1 g/mol, m~30 mg) are placed in a test tube. At ambient temperature, the octanoic acid is in liquid form, whereas the 2-MI is a solid that sediments to the bottom of the tube. At 120° C. and with slight manual stirring, the catalyst is rapidly dissolved. 6.1 mmol of benzyl glycidyl ether (Mw=164.2 g/mol, m=1 g) are added and the reaction mixture is stirred in order to homogenize it.

The mixture is heated under a stream of nitrogen (~40 ml/min) at 120° C.

The reaction progress is measured by IR spectroscopy by monitoring the intensity of the $\upsilon_{C=O}$ bands of the ester at 1735 cm$^{-1}$ and of the acid at 1705 cm$^{-1}$ and also $\delta_{C-O-C}$ (ring vibration) of the epoxy at 915 cm$^{-1}$.

After one hour, it is found by this means that the conversion no longer changes. $^{13}$C NMR analysis (CDCl$_3$/TMS) confirms the disappearance of the [COOH] signal at 181 ppm and the appearance of the [COOR] signal at 174 ppm.

The product obtained at the end of this reaction is the ester E1, which is the product of esterification between octanoic acid and benzyl glycidyl ether, which is confirmed by the $^1$H and $^{13}$C NMR analysis.

Preparation of the Ester E2:

The protocol is identical to the preceding. The reaction mixture is then formed from 6.7 mmol of phenyl glycidyl ether (Mw=150.2 g/mol, m=1 g), 6.7 mmol of decanoic acid (Mw=172.3 g/mol, m=1.15 g) and 0.4 mmol of 2-MI (6 mol %, m~33 mg). The decanoic acid and the catalyst C1 are in solid form: the mixture is thus homogenized with gentle stirring at 120° C. The reaction is performed at 120° C. under a stream of 40 ml/min of nitrogen. The reaction progress is monitored in the same manner as previously: the conversion is complete after one hour. This is confirmed by $^{13}$C NMR. The product obtained is the ester E2.

Transesterification Tests:

0.65 mmol of E1, 0.65 mmol of E2 and 0.032 mmol (5 mol %) of catalyst C2, which is the test product, are placed in a test tube. The mixture is homogenized by heating to 150° C. and gently stirring. The reaction mixture is heated to 150° C. using an oil bath under a stream of 40 ml/min of nitrogen.

Samples are taken regularly in order to monitor the transesterification kinetics. Each sample taken is analyzed by gas chromatography coupled to mass spectrometry (GC-MS) using a Shimadzu GCMS-QP 2010S machine. The chromatographic analysis is performed with a Shimadzu GC-2010 machine equipped with a Supelco capillary column (model 28041-U) 12 m long, 0.2 mm inside diameter, packed with a film of 0.33 μm of non-polar poly(dimethylsiloxane) stationary phase (Equity™-1 phase). The vector gas is helium, with an inlet pressure of 34.6 kPa, a total flow rate of 44.4 ml/min, a column flow rate of 0.68 ml/min, a linear velocity of 48 cm/s and a purge flow rate of 3 ml/min.

Injection of 1 μL of a solution in methanol of the product to be analyzed at a concentration of between 1 mg/g and 5 mg/g is performed at an injection temperature of 250° C. in split mode, with a split ratio of 60%. The column temperature cycle after injection is divided into a plateau at 80° C. for 30 seconds followed by a ramp of 24° C./minute up to 280° C. This temperature is then kept constant for 7 minutes, for a total analysis time of 16 minutes.

The GC chromatograph is coupled to a Shimadzu electron-impact mass spectrometer (EIMS) at 70 eV. The temperature of the ion source and that of the interface are, respectively, 200 and 300° C.

Figure 2:
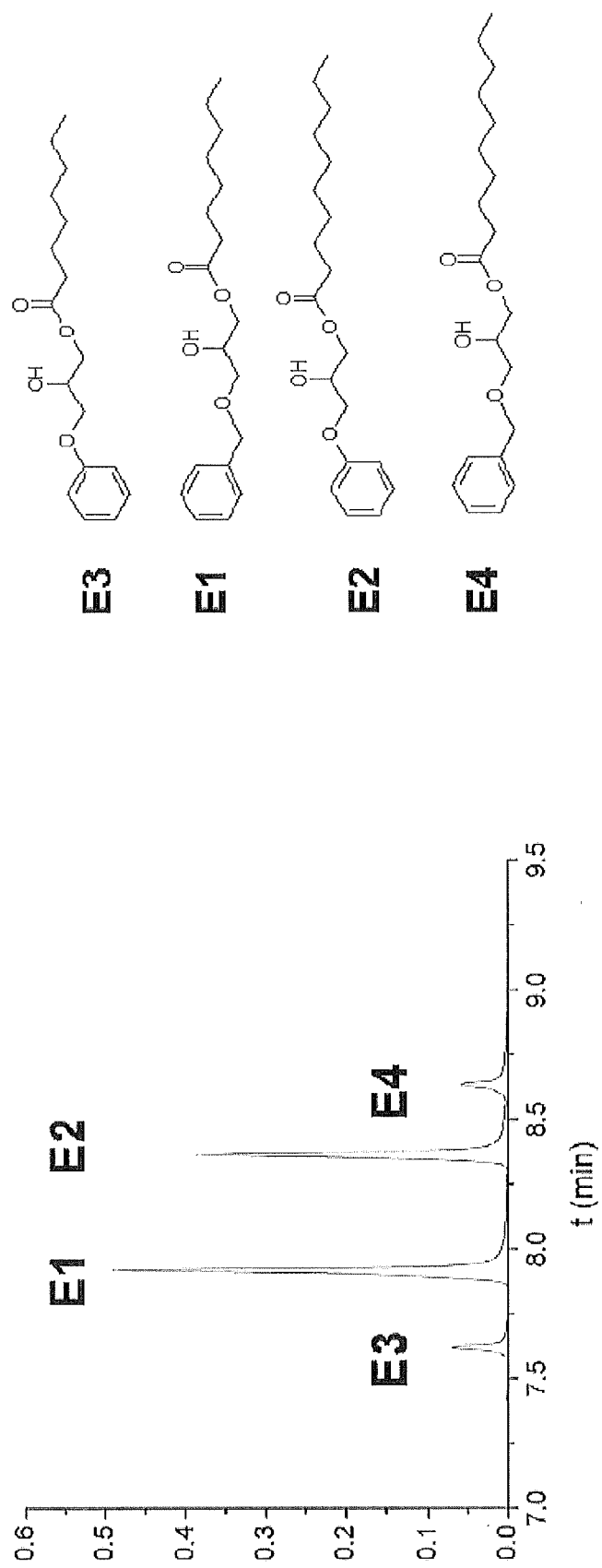
Figure 3:
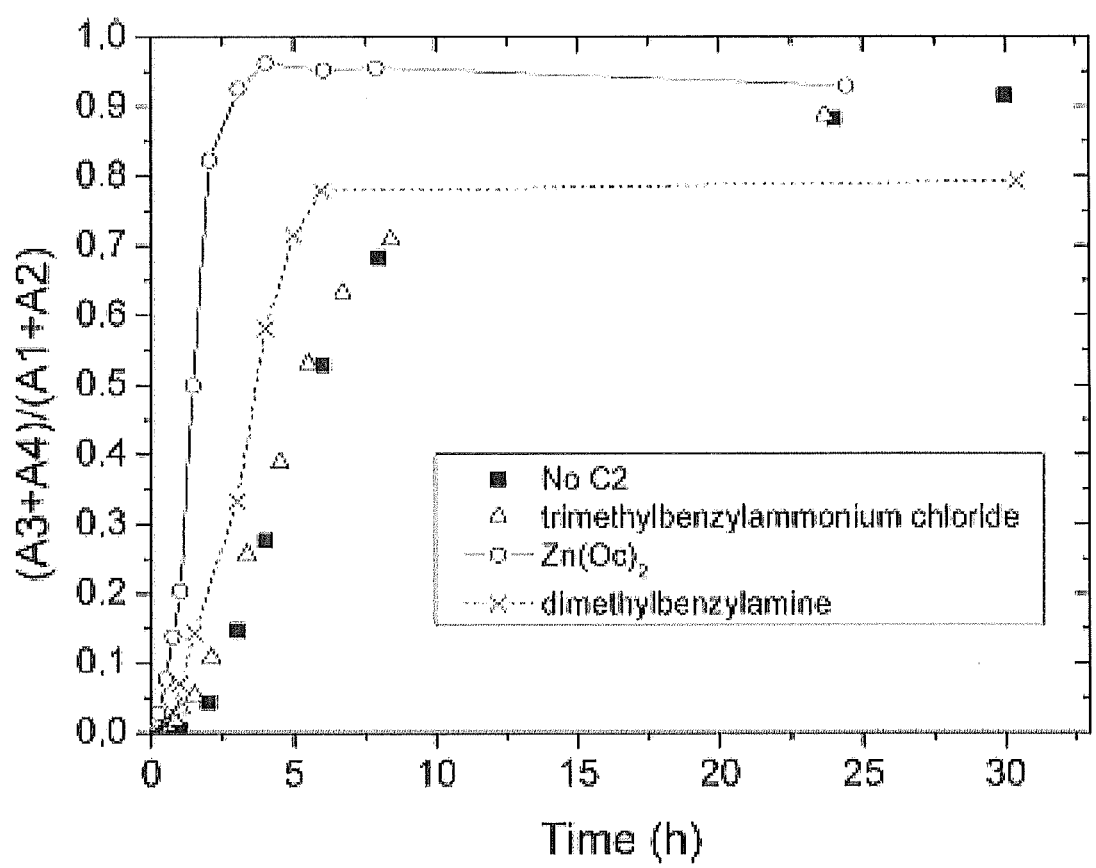

The area of the signals present in the chromatogram of FIG. 2 corresponding to the monoesters E1, E2, E3 and E4, which are exchange products, is measured (these areas are noted A1, A2, A3 and A4, respectively). The monoesters are identified by means of the fragmentation obtained by mass spectrometry. The retention times corresponding to the monoesters E1, E2, E3 and E4 are, respectively, 7.9, 8.4, 7.6 and 8.6 min. The kinetics are obtained by plotting the ratio of the areas (A3+A4)/(A1+A2) as a function of the sampling time, and as illustrated in FIG. 3.

Advantageously, a product is considered to be a catalyst for the purpose of the present invention if the time for which the ratio reaches 0.9 is less than 5 h.

The catalyst may be chosen from:
catalysts of organic nature, such as: benzyldimethylamine, benzyltrimethylammonium chloride, guanidines, for instance triazabicyclodecene, amidines, pyridines, for instance 4-pyrrolidinopyridine, dimethylaminopyridine;
metal salts, salts of rare earth elements, of alkali metals and of alkaline-earth metals, in particular:
Zn, Sn, Mg, Co, Ca, Ti and Zr salts, in particular acetylacetonates, such as cobalt acetylacetonate or samarium acetylacetonate;
tin derivatives, such as dibutyltin laurate, tin octoate, dibutyltin oxide, dioctyltin, dibutyldimethoxytin, tetraphenyltin, tetrabutyl 1,3-dichloro-distannoxane and all the other stannoxanes;
salts of rare earth elements, of alkali metals and of alkaline-earth metals, in particular acetates of rare earth elements, of alkali metals and of alkaline-earth metals, such as calcium acetate, zinc acetate, tin acetate, cobalt acetate, nickel acetate, lead acetate, lithium acetate, manganese acetate, sodium acetate or cerium acetate;
salts of saturated or unsaturated fatty acids and of metals and also of alkali, alkaline-earth and rare-earth metals, for instance zinc stearate;
metal oxides, such as zinc oxide, antimony oxide or indium oxide;
metal alkoxides, such as titanium tetrabutoxide, titanium propoxide, titanium isopropoxide, titanium ethoxide, but also zirconium alkoxide, niobium alkoxide and tantalum alkoxide;
metal alcoholates and hydroxides, of alkali metals, of alkaline-earth metals and of rare earth elements, such as sodium alcoholate, in particular sodium methanolate, potassium alcoholate, lithium alcoholate;
sulfonic acids; mention may in particular be made of: sulfuric acid, methanesulfonic acid and para-toluenesulfonic acid;
phosphines; mention may in particular be made of: triphenylphosphine, dimethylphenylphosphine, methyldiphenylphosphine and tri-tert-butylphosphine;
phosphazenes.

Advantageously, the catalyst is chosen from those which have transesterification kinetics comparable to those of the metal salts of zinc, of tin, of magnesium, of cobalt, of calcium, of titanium and of zirconium, in particular the acetylacetonates of these metals.

Preferably, the catalyst is chosen from metal salts of zinc, of tin, of magnesium, of cobalt, of calcium, of titanium and of zirconium. These catalysts are generally in solid form and, in this case, advantageously in the form of a finely divided powder.

A heterogeneous catalyst may be used, that is to say a catalyst which is not in the same phase as the reagents, but a homogeneous catalyst, present in the same phase as the reagents, is advantageously used.

As is explained below in the description of the process, the catalyst is dissolved in the thermosetting resin precursor or in the hardener.

The catalyst, solid or liquid, is preferably soluble in the thermosetting resin precursor. Advantageously, the catalyst, solid or liquid, is soluble in the thermosetting resin precursor under the conditions in which the process of the invention is carried out. To manufacture the thermosetting/supramolecular hybrid resin according to the invention, advantageously, in a first step, the catalyst is dissolved in the hardener composition. When the catalyst is of metallic nature, an exchange takes place between the ligands of the catalyst and the acid groups so as to form a new catalyst: the salt consisting of the metal of the catalyst and of the carboxylic acid used as hardener. This solubilization advantageously takes place by heating and stirring.

Advantageously, to produce the resin of the invention, the salt of a metal that may be chosen from zinc, tin, magnesium, cobalt, calcium, titanium and zirconium and of an acid that may be chosen from the list of acid hardeners above is thus used as self-catalyzed hardener for the crosslinking reaction of the thermosetting resin precursor.

Among the epoxide-opening catalysts that may be used in addition to the transesterification catalyst, mention may be made of: tin tetrachloride, organoboron salts, trialkylamines, hexamethylenetetramine, divalent tin salts, aniline-formaldehyde condensates, tertiary amines, N,N-alkanolamines, metal chelates comprising epoxy groups, amine salts of polyacids, uranium salts, trialkanolamine borates, organosubstituted phosphines, fluoroborates, quaternary ammonium salts, quaternary monoimidazoline salts, dicyanodiamides and imidazolines.

When an epoxide-opening catalyst is used, it is advantageously present in amounts ranging from 0.1 mol % to 5 mol % relative to the number of moles of epoxide groups.

A subject of the invention is also a kit for the preparation of a thermosetting/supramolecular hybrid resin or for the preparation of a composite material comprising a thermosetting/supramolecular hybrid resin as described above, comprising at least one first composition comprising a thermosetting resin precursor (P), this thermosetting resin precursor comprising hydroxyl functions and/or epoxy groups, and optionally ester functions, at least one second composition comprising a hardener (D) chosen from carboxylic acids and anhydrides, at least one composition comprising a compound (C) comprising, on the one hand, an associative group and, on the other hand, at least one function allowing the grafting thereof to the thermosetting resin precursor (P), to the hardener (D) or to the product resulting from the reaction of (P) and (D), and at least one transesterification catalyst, the first and the second composition being in packaging suitable for preventing the crosslinking reaction between the precursor and the hardener from taking place without intervention of an operator. The second and the third composition can form a single composition or be separated. Such a kit makes it possible to prepare a thermosetting resin, the compositions being mixed together just before use. It may be envisioned for the hardener composition to comprise the catalyst, and preferably the product of the exchange reaction between the ligands of the catalyst and the hardener.

Such packaging may consist of a container comprising two or three internal compartments for separately storing each of the components, it being understood that the catalyst may optionally be stored in the same compartment as the precursor or as the hardener. Preferentially, the catalyst is stored in the same compartment as the thermosetting resin precursor. A means may be provided for bringing into contact the contents of the various compartments so as to initiate the crosslinking in the container. A kit consisting of two or three separate flasks combined in the same packaging and each comprising suitable amounts of each product for the preparation of the thermosetting/supramolecular hybrid resin, so as to save the user from performing weighing and/or metering operations, may also be provided.

According to one variant, the kit for the preparation of a thermosetting resin may consist of a single container, comprising the unreacted or incompletely reacted mixture of the four components: precursor, hardener, associative compound and catalyst. Indeed, in the absence of heating, and unlike epoxy-amine mixtures, the epoxy precursor+acid+associative compound mixtures have a stability of approximately two months at ambient temperature, even in the presence of catalyst. The operator's intervention is then limited to heating.

A subject of the invention is also compositions of thermosetting/supramolecular hybrid composite material comprising at least one thermosetting/supramolecular hybrid resin of which the composition has been described above. Such a material may comprise, in addition to the thermosetting resin(s) according to the invention: one or more polymers, pigments, dyes, fillers, plasticizers, fibers, flame retardants, antioxidants, lubricants, wood, glass, metals.

Among the polymers that may be used as a mixture with the hybrid resin composition of the invention, mention may be made of: elastomers, thermoplastics, thermoplastic elastomers, impact additives.

The term "pigments" is intended to mean colored particles that are insoluble in the resin. As pigments that can be used in the invention, mention may be made of titanium oxide, carbon black, carbon nanotubes, metal particles, silica, metal oxides, metal sulfides or any other inorganic pigment; mention may also be made of phthalocyanines, anthraquinones, quinacridones, dioxazines, azo pigments or any other organic pigment, natural pigments (madder, indigo, crimson, cochineal, etc.) and mixtures of pigments. The pigments may represent from 0.05% to 15% by weight relative to the weight of the material.

The term "dyes" is intended to mean molecules that are soluble in the epoxy resin and that have the capacity to absorb part of the visible radiation.

Among the fillers that may be used in the resin composition of the invention, mention may be made of: silica, clays, calcium carbonate, carbon black, kaolin, whiskers.

The presence, in the hybrid resin compositions of the invention, of fibers such as glass fibers, carbon fibers, polyester fibers, polyamide fibers, aramid fibers, cellulose and nanocellulose fibers or else vegetable fibers (flax, hemp, sisal, bamboo, etc.) may also be envisioned.

It may also be envisioned for the hybrid resin compositions of the invention to be used for manufacturing sandwich materials by alternating superposition of layers of resin or of resin-based composite with layers of wood, of metal or of glass.

The presence, in the hybrid resin composition of the invention, of pigments, dyes or fibers capable of absorbing radiation may be used to provide the heating of an article based on such a resin by means of a radiation source such as a laser. The presence, in the hybrid resin composition, of pigments, fibers or electrically conducting fillers, such as carbon black, carbon nanotubes, carbon fibers, metal powders or magnetic particles, may be used to provide the heating of an article based on such a resin by the Joule effect, by induction or by microwaves. Such heating may allow the implementation of a process for manufacturing, transforming or recycling an article made of hybrid resin according to a process which is described below.

A subject of the invention is also a process for manufacturing an article based on a thermosetting/supramolecular hybrid resin composition as described above, this process comprising:

a) bringing a first composition comprising at least one thermosetting resin precursor (P) into contact with a second composition comprising at least one hardener (D) chosen from carboxylic acids and anhydrides, and with a third composition comprising at least one compound (C) comprising, on the one hand, at least one associative group and, on the other hand, at least one function allowing the grafting thereof to the thermosetting resin precursor (P), to the hardener (D) or to the product resulting from the reaction of (P) and (D), in the presence of at least one transesterification catalyst, b) forming the composition resulting from step a), c) applying an energy for curing the resin, d) cooling the cured resin.

It should be understood that, in the process of the invention, the second and the third composition can form a single composition, in particular when the compound (C) comprises, on the one hand, an associative group and, on the other hand, a carboxylic acid function.

The bringing into contact of the components may take place in a mixer of any type known to those skilled in the art. The application of an energy for curing the resin in step c) of the process may consist, in a known manner, in heating to a temperature ranging from 50 to 250° C. The cooling of the cured resin is usually performed by leaving the material to return to ambient temperature, with or without use of a cooling means.

The process is advantageously carried out in such a way as to reach or exceed the gel point of the resin at the end of step d). In particular, the process of the invention advantageously comprises applying a sufficient energy in step c) for the gel point of the resin to be reached or exceeded.

For the purpose of the present invention, the term "article" is intended to mean a thermoset component based on a material comprising a thermosetting/supramolecular hybrid resin, in particular an epoxy/associative hybrid resin, as described above. It may be an article made of a composite material. It may in particular be envisioned to introduce, before, during or after step a), one or more additional components which may in particular be chosen from polymers, pigments, dyes, fillers, plasticizers, fibers, flame retardants, antioxidants, lubricants, wood, glass and metals. Advantageously, in the articles according to the invention, the resin has reached or exceeded the gel point.

The articles according to the invention may also consist of coatings which are deposited on a support, for instance a protective layer or a paint. They may also consist of an adhesive material.

In practice, the catalyst is first dissolved in the composition comprising the hardener, generally by heating with stirring, and then the two or three compositions are mixed together.

For example, epoxy-acid-associative networks are obtained by condensation of UDETA with carboxylic acid mixtures and then polymerization of the mixtures of acid dimers and trimers and of BADGE.

The synthesis takes place in four steps. First of all, the associative compound precursor is reacted with the acid hardener, so as to form a mixture of unreacted hardener and of associative compound with a carboxylic acid functionality. The catalyst is then dissolved in the hardener (fatty acid oligomer, for example). This step requires high temperatures for the metal salts (preferably above 180° C.). Solubility is obtained by exchanges between the ligands of the catalysts (acetate, acetylacetonate, octoate, tert-butoxide) and the fatty acids. An evolution of acetic acid has been demonstrated in the case of $Zn(ac)_2$, and can be facilitated when the process is performed under vacuum. Next, the BADGE epoxy resin is introduced and the mixture is stirred with heating until a homogeneous mixture is obtained. The mixture is finally left to cure in a mold for a time sufficient to complete the polymerization of the resin.

An article resulting from the forming and curing of the resin composition described above is also part of the invention.

In particular, the invention relates to a thermoset article or material, based on thermosetting/supramolecular hybrid resin, which can be obtained by means of the process described above. In particular, it relates to a thermoset article or material based on thermosetting/supramolecular hybrid resin, this resin having reached or exceeded the gel point.

The expression "application of an energy for curing the resin" is generally intended to mean raising the temperature.

Usually, an article based on thermosetting/supramolecular hybrid resin is manufactured by mixing the following components: precursor, hardener, associative compound, catalyst and additives, placing in a mold and raising the temperature. The means for manufacturing such an article are well known to those skilled in the art.

However, by virtue of the resin compositions of the invention, methods for forming the article other than molding may be envisioned, such as filament winding, continuous molding or film-insert molding, infusion, pultrusion, RTM (resin transfer molding), RIM (reaction-injection-molding) or any other methods known to those skilled in the art, as described in the publications "Epoxy Polymer", edited by J. P. Pascault and R. J. J. Williams, Wiley-VCH, Weinheim 2010 or "Chimie Industrielle" ["Industrial Chemistry"], by R. Perrin and J. P. Scharff, Dunod, Paris 1999.

With the application of such a process to the thermosetting resin compositions of the prior art, once the resin has cured, the article can no longer be transformed or repaired or recycled. Indeed, once the gel point of the resin has been reached or exceeded, an article made of thermosetting resin of the prior art can no longer be transformed or repaired or recycled.

The application of a moderate temperature to such an article according to the prior art does not lead to any observable or measurable transformation, and the application of a very high temperature leads to degradation of this article.

In contrast, the materials based on thermosetting/supramolecular hybrid resin of the invention, on account of their particular composition, can be transformed, repaired and recycled by raising the temperature of the article.

Notably, the use, by assembly, of components according to the invention and, similarly, the repair of articles according to the invention may comprise a first step of bringing the components to be assembled into contact at ambient temperature, which step allows a first forming, followed by a step of raising the temperature which makes it possible to complete the assembling of the components and to thus confer on the article satisfactory mechanical properties.

One particular case of an article of the invention consists of a material resulting from the curing of a resin of the invention. The mechanical properties of such materials are characterized below and illustrate the innovative nature of the invention. These properties are retained even after transformation of these materials by means of a process as described above (application of a mechanical stress and of temperature elevation).

Below the glass transition temperature Tg, the polymer is vitreous and has the behavior of a rigid solid body.

Above the temperature Tg, it has a viscoelastic behavior over a broad range of temperatures, with a storage modulus of between $1\times10^3$ and $5\times10^7$ Pa according to the composition. This storage modulus can be determined by means of a mechanical dynamic measurement at 1 Hz known to those skilled in the art. In a stress relaxation experiment, in which a constant strain is applied to the sample at a given temperature, it is noted that the stress decreases at long times. Such a decrease in stress does not appear in the case of conventional thermoset materials or thermoset/supramolecular hybrids, apart from under conditions of degradation of the material. The quasi-exponential decrease in the stress with time makes it possible to define the relaxation time $T_R$ of the material and also the plateau modulus $G_0$: $G(t) \approx G_0 * \exp(-t/\tau_R)$. The viscosity of the material may be calculated via the relationship: $\eta = \tau_R \times G_0$, with $\eta$ the viscosity in Pa·s, $G_0$ in Pa, and $\tau_R$ in seconds.

Depending on the composition, the viscosity determined using a strain of 10% for the stress relaxation varies between $10^5$ Pa·s and $5\times10^{10}$ Pa·s at a temperature of Tg+200° C. for the materials according to the invention. The degree of relaxed stress: $(G_0-G(t))/G_0$ is greater than 20% after 3 h of relaxation.

The invention thus also relates to an article or material resulting from the curing of a resin of the invention, the viscosity of which is between $10^5$ and $5\times10^{10}$ Pa·s at temperatures of between 150° C. and 300° C.

This slow variation in viscosity over a broad range of temperatures makes the behavior of the material comparable to that of inorganic glasses and allows additional transformation processes to be applied thereto relative to those that can be applied to thermoplastics.

For the same composition, the viscosity of the material follows a dependency of Arrhenius type as a function of the temperature, and does so over a broad temperature range (typically 100° C. to 300° C.): $\eta = B \times \exp(-A/T)$, where A is the activation parameter in K, T is the absolute temperature in K, and B is a constant in Pa·s. The value of the activation parameter is typically between 7000 and 15 000K.

From a practical point of view, this implies that, in a broad range of temperatures, the article can be strained, and then, in a second step, the internal stresses can be removed at a higher temperature.

Without in as much being bound to this explanation, the inventors think that the transesterification exchanges are responsible for the relaxation of stresses and of the variation in viscosity at high temperatures. In terms of application, these materials can be treated at high temperatures, where a low viscosity allows injection or molding in a press. It should be noted that, contrary to Diels-Alder reactions, no depolymerization is observed at high temperatures and the material retains its crosslinked structure. This property allows the repair of two parts of an article. No mold is necessary for maintaining the shape of the components during the repair process at high temperatures. Similarly, components can be transformed by application of a mechanical stress to only one part of an article without the need for a mold, since the material does not flow. However, large-sized components, which have more of a tendency to collapse, can be maintained by a support frame as in the case of glassworking.

Another subject of the invention is therefore a process for transforming at least one article made from a material as described above, this process comprising: applying a mechanical stress to the article and raising the temperature of the article to a temperature (T) above ambient temperature.

Preferably, in order to enable transformation within a time that is compatible with industrial application of the process, the process comprises applying a mechanical stress to the article and raising the temperature to a temperature (T) above the glass transition temperature Tg of the material, in particular of the resin, of which the article is composed.

Usually, such a process is followed by a step of cooling to ambient temperature, optionally with application of at least one mechanical stress.

For the purposes of the present invention, the term "mechanical stress" is intended to mean the application of a mechanical force, locally or to all or part of the article, this mechanical force aiming to form or strain the article.

Among the mechanical stresses that can be used, mention may be made of: pressure, molding, blending, extrusion, blow-molding, injection-molding, stamping, twisting, flexing, pulling and shearing.

It may, for example, be twisting applied to a strip of material of the invention. It may be a pressure applied by means of a plate or a mold to one or more faces of an article of the invention, stamping a pattern in a plate or a sheet made of material of the invention. It may also be a pressure exerted in parallel onto two articles made of materials of the invention in contact with one another so as to bring about adhesive bonding of these articles. In the case where the article consists of granules of material of the invention, the mechanical stress may consist of blending, for example in a blender or around an extruder screw. It may also consist of injection-molding or extrusion. The mechanical stress may also consist of blow-molding, which may be applied, for example, to a sheet of material of the invention. The mechanical stress may also consist of a plurality of distinct stresses, of identical or different nature, applied simultaneously or successively to all or part of the article or in a very localized manner.

This transformation may include mixing or agglomeration with one or more additional components chosen from: one or more polymers, pigments, dyes, fillers, plasticizers, fibers, flame retardants, antioxidants, lubricants, wood, glass or metals.

Assembly, adhesive bonding and repair are particular cases of the transformation process described above.

According to a first variant, the step of applying a mechanical stress to the article is carried out at ambient temperature and the raising of the temperature to a temperature (T) above ambient temperature is subsequently carried out. This first variant relates more particularly to the repair, adhesive bonding and assembly of components made of materials of the invention. It takes advantage of the property of supramolecular networks of self-repairing at ambient temperature. The subsequent raising of the temperature, which can be carried out with or without application of a mechanical stress, makes it possible to reconstitute the polymeric network and to restore satisfactory mechanical properties to the article.

According to a second variant, the step of applying a mechanical stress to the article is carried out simultaneously with the raising of the temperature to a temperature (T) above ambient temperature. This second variant can more generally be used with all the means for applying a mechanical force to an article.

This raising of the temperature of the article can be carried out by any known means, such as heating by conduction, convection, induction, spot heating, infrared, microwave or radiant heating. The means for bringing about an increase in temperature of the article in order to perform the processes of the invention comprise: an oven, a microwave oven, a heating resistance, a flame, an exothermic chemical reaction, a laser beam, a hot iron, a hot-air gun, an ultrasonication tank, a heating punch, etc.

The raising of the temperature may or may not be carried out in stages, and its duration is adapted to the expected result as a function of the indications that will be given and of the examples detailed below.

The process of the invention is based in particular on transesterification reactions that are promoted by the presence of the catalyst and by the free OH functions within the polymer network in the materials of the invention according to dynamics illustrated in FIG. 1.

This material also contains supramolecular bonds, preferably hydrogen bonds, between the associative groups borne by the molecules of which it is composed. The presence of these reversible hydrogen bonds, capable of being broken by an increase in temperature and of reforming at ambient temperature, allows the material according to the invention to self-repair, and to have a low viscosity in the molten state, facilitating its processing, and possibly a high elongation at break at ambient temperature, without it having, however, a high molecular weight.

Although the material does not flow during the transformation, by virtue of the transesterification reactions and the associative exchanges, by selecting a suitable temperature, a suitable heating time and suitable cooling conditions, the new shape may be free of any residual stress. The material is thus not embrittled or fractured by the application of the mechanical stress. Furthermore, the component will not return to its first shape. Indeed, the transesterification reactions which occur at high temperature promote a reorganization of the crosslinking points of the polymer network so as to cancel out the mechanical stresses. A sufficient heating time makes it possible to completely cancel out these mechanical stresses internal to the material that have been caused by the application of the external mechanical stress.

This method thus makes it possible to obtain stable complex shapes, which are difficult or even impossible to obtain by molding, from simpler elemental shapes. In particular, it is very difficult to obtain by molding shapes resulting from twisting.

An article made of material of the invention may also be recycled:
either by direct treatment of the article: for example, the broken or damaged article is repaired by means of a transformation process as described above and can thus regain its prior working function or another function;
or the article is reduced to particles by application of mechanical grinding, and the particles thus obtained can then be used in a process for manufacturing an article. In particular, according to this process, particles of material of the invention are simultaneously or successively subjected to a raising of the temperature and to a mechanical stress allowing them to be transformed into an article.

The mechanical stress that allows the transformation of particles into an article may, for example, comprise compression in a mold, blending or extrusion.

This method thus makes it possible, by applying a sufficient temperature and a suitable mechanical stress, to mold articles from the thermoset material. In particular, it makes it possible to mold articles from the material based on thermoset resin having reached or exceeded the gel point.

Another advantage of the invention is that it allows the manufacture of materials made of thermoset/supramolecular hybrid resin from liquid starting materials, in the form of elemental components or units based on thermoset resin having reached or exceeded the gel point: particles, granules, beads, rods, plates, sheets, films, strips, shafts, tubes, etc., by any process known to those skilled in the art. These elemental components can then be transformed, under the successive or joint action of heat and a mechanical stress, into articles of the desired shape: for example, strips may, by stamping, be chopped into smaller pieces of chosen shape, sheets may be superposed and assembled by compression. These elemental components based on thermoset/supramolecular hybrid material, in particular based on epoxy/associative resin, are easier to store, to transport and to handle than the liquid formulations from which they are derived. Indeed, the step for transforming the components according to the invention can be carried out by the final user without chemical equipment (no toxicity, or expiry date or VOC, and no weighing out of reagents).

A subject of the invention is therefore a process for manufacturing at least one article based on thermosetting/supramolecular hybrid resin, which is a particular case of the transformation process already described, this process comprising:
  a) using as starting material a material or article of the invention in the form of an elemental unit or of a collection of elemental units,
  b) applying a mechanical stress and raising the temperature so as to form the article,
  c) cooling the article resulting from step b).

In particular in step a), the material or article of the invention is advantageously based on thermoset resin having reached or exceeded the gel point.

In step b) of this process, the applying of a mechanical stress and the raising of the temperature serving to form the article can consist of two successive or simultaneous operations.

Another advantage of this process is that it allows the material to be recycled after use, it being possible for articles to be reconditioned in the form of elemental units or components and then again reformed according to the invention.

A subject of the invention is therefore a process for recycling an article made of material of the invention, this process comprising:
  a) using the article as starting material,
  b) applying a mechanical stress, and optionally simultaneously raising the temperature, so as to transform this article into a collection of elemental units,
  c) cooling this collection of elemental units.

In particular in step a), the article is advantageously based on thermoset resin having reached or exceeded the gel point.

The term "elemental units" is intended to mean components that have a standardized shape and/or appearance and that are suitable for subsequent transformation thereof into an article, for instance: particles, granules, beads, rods, plates, sheets, films, strips, shafts, tubes, etc. The term "collection of elemental units" is intended to mean at least two elemental units, better still at least three, even better still at least 5, preferentially at least 10, even more preferentially at least 100, advantageously at least $10^3$, even more advantageously at least $10^4$, and preferentially at least $10^5$.

The materials and the processes of the invention make it possible to remedy the drawbacks of the prior art materials, which are the non-transformability and the non-recyclability of articles based on epoxy/associative hybrid resin, in particular when these resins have reached or exceeded their gel point. They make it possible in particular to transform and recycle as many times as is desired the article based on epoxy/associative hybrid resin. The process also makes it possible to manufacture epoxy/associative resins in a solid form, which is easy to store, to transport and to handle, these new forms of epoxy/associative resin, referred to as elemental units, being usable directly for the manufacture of articles by application of a transformation step conventionally used for thermoplastics. Finally, these resins and these materials allow new applications of thermosetting/supramolecular resins by the application of new transformation methods for these resins and by the possibility of programming controlled transformations of these materials.

The materials of the invention also have the advantage of exhibiting very low, or even zero, shrinkage when molded, which is a significant advantage compared with the prior art materials.

They have, as regards the materials obtained from hardeners of long-chain aliphatic acid type, elastomeric properties, that is to say the property of being able to be subjected to a uniaxial strain at ambient temperature and of recovering, once this stress has been released, their initial size, with a set of less than 5% of their initial size.

The fields of application of these materials are those of thermosetting resins: materials and composites for motor vehicles, for aeronautical construction, electronics, sport, construction, printing, packaging and cosmetics.

They can in particular be used for manufacturing leaktight seals, thermal or acoustic insulators, tires, cables, sheaths, footwear soles, packagings, coatings (paints, films, cosmetic products), patches (cosmetic or dermopharmaceutical), or other systems for trapping and releasing active agents, dressings, elastic clamp collars, vacuum pipes, pipes and flexible tubing for the transportation of fluids, with generally the components having to exhibit good resistance to tearing and/or to fatigue, rheological additives or additives for adhesives and hot-melt adhesives. In these applications, the materials according to the invention can be used as such or in single-phase or multiphase mixtures with one or more compounds such as petroleum fractions, solvents, inorganic and organic fillers, plasticizers, tackifying resins, antioxidants, pigments and/or dyes, for example in emulsions, suspensions or solutions.

As a variant, these materials can be used for the manufacture of a cosmetic composition usually comprising a physiologically acceptable medium, that is to say a medium which is compatible with keratin materials.

FIGURES

FIG. 1: schematic representation of the transesterification reactions within the polymer network.

FIG. 2: chromatogram of the products contained in the reaction medium resulting from the transesterification test.

FIG. 3: graphic representation of the transesterification kinetics in the transesterification test.

Figure 4:
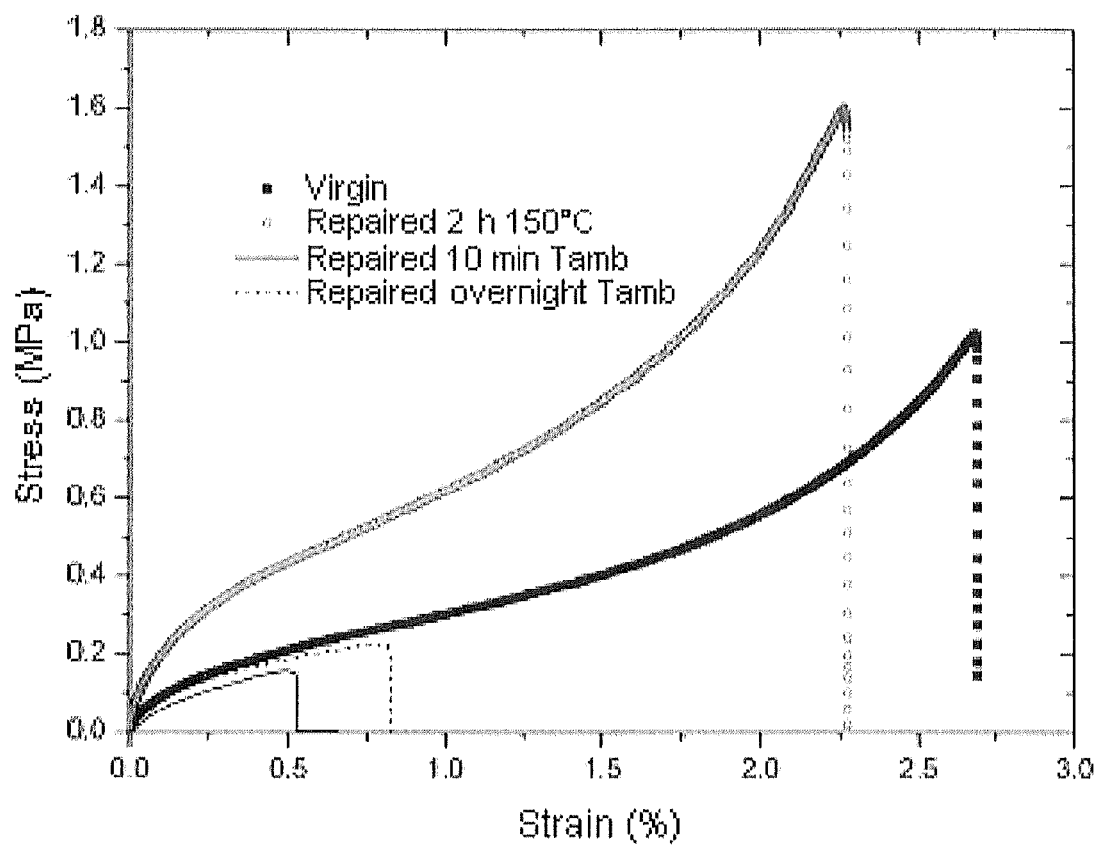

FIG. 4: stress-strain curve for a material of the invention prepared according to example 2.

EXPERIMENTAL SECTION

I—Synthesis Examples

Example 1

Preparation of a Material with Catalyst

First Step: Reaction of the Acid with UDETA 196.4 g of Pripol® 1040 [molar mass per COOH 296 g/mol, dimer content (23%), trimer content (77%)] and 27.4 g of UDETA [molar mass per $NH_2$ 129.2 g/mol], i.e. an $[NH_2]/[COOH]$ molar ratio of 30%, are placed in a reactor. The reaction is carried out with mechanical stirring and nitrogen sweeping (~320 ml/min) at 150° C. An analysis by IR spectroscopy confirms the decrease in the ⊡ $_{C=O}$ band of the acid at 1705 $cm^{-1}$ and also the appearance of the ⊡ $_{C=O}$ band of the amide at 1650 $cm^{-1}$. The reaction is stopped when these bands no longer change, i.e. after 2 h 30. Analyses by $^1H$ and $^{13}C$ NMR confirm the complete reaction of the amines.

Second Step: Dissolution of the Catalyst 82.53 g of the mixture synthesized in step 1 and 1.85 g of zinc acetate dihydrate (8.43 mmol), i.e. a $[Zn]/[COOH]_{remaining}$ molar ratio of 0.05, are placed in a 250 ml round-bottomed flask. The mixture is placed under vacuum, and then heated in stages from 110° C. to 170° C. After 3 h, the catalyst appears to be completely dissolved.

Third Step: Reaction with the Epoxy Resin 19.11 g of the mixture prepared in the second step are added to 6.92 g of BADGE [molar mass per epoxy 174 g/mol] (for a $[COOH]_{remaining}/[epoxy]$ ratio close to 1) in a Teflon beaker. The reaction mixture is homogenized by heating (~130° C.) with mechanical stirring. The mixture is then poured into a mold consisting of a brass plate 1.4 mm thick pierced with a rectangular hole, placed between two sheets of non-stick paper, and then pressed at a pressure of 10 MPa at 130° C. for 12 h. An analysis by IR spectroscopy shows the complete disappearances of the ⊡ $_{C=O}$ band of the acid at 1705 $cm^{-1}$ and the $\delta_{C-O-C}$ band (ring vibration) of the epoxy at 915 $cm^{-1}$ and the appearance of the ⊡ $_{C=O}$ band of the ester at 1735 $cm^{-1}$.

Example 2

Comparison of Conventional Hybrid Networks/Hybrid Networks with Catalyst

Three dumbbell-shaped test specimens with a width of 5 mm, a working length of 25 mm and a thickness of 1.35 mm are cut from a sheet from material synthesized according to example 1, using a hole punch, according to standard ISO 527-3.

A tensile strength test is performed at ambient temperature with a constant speed of displacement (10 mm/min) on an Instron® 5564 machine. The stress as a function of the strain of the test specimen is recorded.

One of the stress-strain curves obtained on the "virgin" sample is represented with solid squares in FIG. 4. A stress at break of 1.02 MPa and a strain at break of 270% are then obtained.

This sample can be partially repaired at ambient temperature: the fractured parts of the test specimen are put back together by applying a small pressure and left to stand at ambient temperature.

After 10 min (continuous line) or an overnight period (dashed line), a repair of respectively 20% and 31% is obtained (ratio of the strain at break before and after repair). This first step of relatively modest repair can be followed by a second step of repair at high temperature. Increasing the UDETA content in the synthesis of the material makes it possible to increase the efficiency of the first repair step: for a content of 50%, a repair of 85% is obtained over the course of 24 h.

The second step of the repair is carried out in an oven at 150° C. for 120 min (after a first step of 120 min). The stress-strain curve of the sample thus repaired is represented in FIG. 4 with empty circles. The repair is much more efficient, with a repair of 84%.

Example 3

Forming of the Chemically Crosslinked Material by Injection-Molding

The forming by injection-molding is carried out using a DSM injector equipped with a dumbbell-shaped test specimen mold according to standard ISO 527-3.

Small pieces with a side length of 2-3 mm are cut from a sheet of material synthesized according to example 1, in sufficient amount to pack the mold used (in practice, approximately 5 g), and then placed in the barrel brought to a temperature of 250° C. After a few seconds of temperature establishment, the material is injected into the mold stabilized at the temperature of 200° C. by means of a 16-bar pressure for a total cycle of 30 s. After annealing for 10 min at 200° C., the mold is cooled by circulation of water allowing the temperature to decrease from 200° C. to 20° C. over the course of approximately 5 minutes. The injected test specimen is immediately extracted from the mold; it exhibits neither defect nor shrinkage.

The invention claimed is:

1. A hybrid resin material that has undergone transesterification, wherein the hybrid resin material comprises a three dimensional network featuring ester functions, hydroxyl functions, and associative groups, and wherein the hybrid resin is formed by combining and reacting: at least one thermosetting resin precursor with a hardener composition;
    wherein the at least one thermosetting resin precursor comprises hydroxyl functions, epoxy groups, or a combination of hydroxyl functions and epoxy groups;
    wherein the hardener composition comprises at least one transesterification catalyst, at least one hardener and at least one grafting compound;
    wherein the at least one hardener is selected from polycarboxylic acids and anhydrides thereof; and
    wherein the at least one grafting compound comprises at least one associative group and at least one grafting function capable grafting to the at least one thermosetting resin precursor, the at least one hardener, or a reaction product of the at least one thermosetting resin precursor and the at least one hardener.

2. The hybrid resin material as claimed in claim 1, wherein the at least one transesterification catalyst is present in a total molar amount ranging from 1% to 25% of the total molar amount of hydroxyl functions and epoxy groups that are contained in the thermosetting resin precursor.

3. The hybrid resin material as claimed in claim 1, wherein the at least one thermosetting resin precursor is an epoxy resin precursor.

4. The hybrid resin material as claimed in claim 1, wherein the at least one grafting compound is chosen from those corresponding to the following general formula:

in which A represents an associative group,
L represents a linker arm,
R represents a function $R_1$ that is reactive with carboxylic acids, or a function $R_2$ that is reactive with epoxy functions or with alcohol functions.

5. The hybrid resin material as claimed in claim 4, wherein the amount of at least one hardener is chosen such that the resin is in the form of a network, and:
- $N_O$ denoting the number of moles of hydroxyl functions in the at least one thermosetting resin precursor,
- $N_X$ denoting the number of moles of epoxy groups in the at least one thermosetting resin precursor,
- $N_1$ denoting the number of moles of $R_1$ groups in the at least one grafting compound,
- $N_2$ denoting the number of moles of $R_2$ groups in the at least one grafting compound,
- $N_A$ denoting the number of moles of carboxylic acid functions of the at least one hardener which are capable of forming a bond with a hydroxyl function or with an epoxy group of the at least one thermosetting resin precursor:

$$N_A - N_1 < N_O + 2N_X - N_2.$$

6. The hybrid resin material as claimed in claim 4, wherein R represents $NH_2$ or COOH,
L is chosen from aryl, aralkyl, alkanepoly-yl, and alkenepoly-yl functions, optionally interrupted with one or more groups chosen from an ether, amine, thioether, amide, ester, urea, urethane, anhydride and carbonyl bridge, L comprising from 1 to 50 carbon atoms and up to 6 heteroatoms,
A is chosen from groups capable of associating with one another via 1 to 6 hydrogen bonds.

7. The hybrid resin material as claimed in claim 4, wherein the compound A-L-R is chosen from the following molecules:

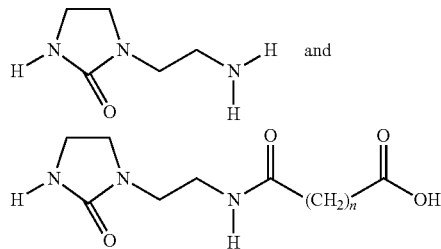

and n represents an integer 1<n<23
and

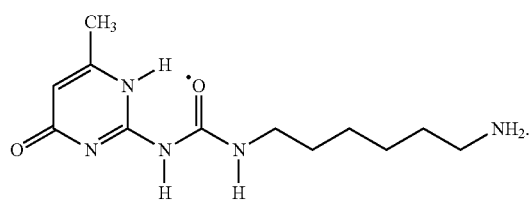 [SMILES: Cc1cc(=O)nc(NC(=O)NCCCCCCN)[nH]1]

8. The hybrid resin material as claimed in claim 4, wherein
- $N_1$ denoting the number of moles of $R_1$ groups in the at least one grafting compound,
- $N_2$ denoting the number of moles of $R_2$ groups in the at least one grafting compound,
- $N_B$ representing the number of hydroxyl functions and epoxy groups of the at least one thermosetting resin precursor that are capable of reacting with $R_2$,
- $N_A$ denoting the number of moles of carboxylic acid functions of the at least one hardener that are capable of forming a bond with a hydroxyl function or with an epoxy group of the at least one thermosetting resin precursor:

$N_1$ and $N_2$ confirm the following two proposals:
$N_1 > 0.01 N_A$ or $N_2 > 0.01 N_B$
$N_1 < 0.9 N_A$ and $N_2 < 0.9 N_B$.

9. The hybrid resin material as claimed in claim 1, wherein the at least one grafting compound is obtained by reacting at least one compound of polyfunctional carboxylic acid type with an associative molecule comprising a function that is reactive with carboxylic acids.

10. The hybrid resin material as claimed in claim 1, wherein the at least one hardener is chosen from: fatty acid dimers and trimers, and polyoxoalkylenes comprising carboxylic acids at the ends.

11. The hybrid resin material as claimed in claim 1, wherein the at least one transesterification catalyst is chosen from: metal salts of zinc, of tin, of magnesium, of cobalt, of calcium, of titanium and of zirconium.

12. The hybrid resin material as claimed in claim 1, wherein the at least one transesterification catalyst is dissolved in a mixture of the at least one hardener and the at least one grafting compound.

13. A composite material comprising at least one hybrid resin material as claimed in claim 1, and at least one material chosen from: one or more polymers, pigments, dyes, fillers, plasticizers, fibers, flame retardants, antioxidants, lubricants, wood, glass and metals.

14. A material or composite for motor vehicles, for aeronautical construction, electronics, sport, construction, printing, packaging and cosmetics, wherein the material or composite comprises the hybrid resin material of claim 1.

15. A process for manufacturing an article based on the hybrid resin material as claimed in claim 1, this process comprising:
a) combining and reacting the at least one thermosetting resin precursor with the hardener composition,
b) forming the material resulting from step a),
c) applying energy to cure the material,
d) cooling the cured material.

16. An article obtained by the process as claimed in claim 15.

17. The article as claimed in claim 16, resulting from the curing of the material resulting from step a), which is characterized by a viscosity of between $10^5$ and $5 \times 10^{10}$ Pa·s at temperatures of between 150° C. and 300° C.

18. A process for transforming at least one article as claimed in claim 16, this process comprising: applying a mechanical stress to the article and raising the temperature of the article to a temperature (T) above ambient temperature.

19. The process as claimed in claim 18, which is a process for assembling, bonding or repairing said at least one article.

20. An article obtained by a process as claimed in claim 18.

21. A process for recycling an article as claimed in claim 16, this process comprising:
a) reducing the article to particles by application of mechanical grinding,
b) using the particles of step a) in a transformation process comprising applying a mechanical stress to the article and raising the temperature of the article to a temperature (T) above ambient temperature.

22. A process for recycling an article as claimed in claim 16, this process comprising:
a) using the article as starting material,
b) applying a mechanical stress, and optionally simultaneously raising the temperature, so as to transform this article into a collection of elemental units,
c) cooling the collection of elemental units.

* * * * *